(12) United States Patent
Schlosser et al.

(10) Patent No.: US 12,064,894 B2
(45) Date of Patent: Aug. 20, 2024

(54) CHAINSAW

(71) Applicant: MILWAUKEE ELECTRIC TOOL CORPORATION, Brookfield, WI (US)

(72) Inventors: Drake J. Schlosser, Hartford, WI (US); Benjamin Gordon, Broomfield, WI (US); John P. Patterson, Waukesha, WI (US); Hans T. Banholzer, Mequon, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 415 days.

(21) Appl. No.: 17/465,095

(22) Filed: Sep. 2, 2021

(65) Prior Publication Data

US 2022/0072732 A1 Mar. 10, 2022

Related U.S. Application Data

(60) Provisional application No. 63/146,371, filed on Feb. 5, 2021, provisional application No. 63/109,594, filed
(Continued)

(51) Int. Cl.
*B27B 17/08* (2006.01)
*B23D 57/02* (2006.01)
(Continued)

(52) U.S. Cl.
CPC .......... *B27B 17/083* (2013.01); *B23D 57/023* (2013.01); *B25F 5/02* (2013.01); *B27B 17/02* (2013.01)

(58) Field of Classification Search
CPC ..... B27B 17/083; B27B 17/02; B23D 57/023; B25F 5/02
(Continued)

(56) References Cited

U.S. PATENT DOCUMENTS 1,929,662 A 10/1933 Wappat
3,485,327 A 12/1969 Gudmundsen
(Continued)

FOREIGN PATENT DOCUMENTS

CN 2892419 Y 4/2007
CN 201089185 Y 7/2008
(Continued)

OTHER PUBLICATIONS

International Search Report and Written Opinion for Application No. PCT/US2021/048828 dated Dec. 20, 2021 (10 pages).
(Continued)

*Primary Examiner* — Omar Flores Sanchez
(74) *Attorney, Agent, or Firm* — Dority & Manning, P.A.

(57) ABSTRACT

A power tool includes a switch moveable between a first position enabling activation of a motor and a second position disabling the motor. The power tool includes a trigger movably coupled to a housing of the power tool between an OFF position and an ON position. The switch moves from the second position to the first position in response to the trigger moving from the OFF position to the ON position. The power tool includes a trigger lock-off pivotably coupled to the housing between a lock position and an unlock position. The trigger lock-off is engageable with the trigger to inhibit movement of the trigger from the OFF position to the ON position when the trigger lock-off is in the lock position. The trigger lock-off allows movement of the trigger from the OFF position to the ON position when the trigger lock-off is in the unlock position.

18 Claims, 22 Drawing Sheets

Related U.S. Application Data on Nov. 4, 2020, provisional application No. 63/074,949, filed on Sep. 4, 2020.

(51) Int. Cl.
   *B25F 5/02* (2006.01)
   *B27B 17/02* (2006.01)

(58) Field of Classification Search
   USPC .......................................................... 30/381
   See application file for complete search history.

(56) References Cited

U.S. PATENT DOCUMENTS

| | | |
|---|---|---|
| 3,664,390 A | 5/1972 | Mattsson et al. |
| 3,739,475 A | 6/1973 | Moore |
| 3,757,194 A | 9/1973 | Weber et al. |
| 3,776,331 A | 12/1973 | Gustafsson |
| 3,785,465 A | 1/1974 | Johansson |
| 3,793,727 A | 2/1974 | Moore |
| 3,837,433 A | 9/1974 | Combs, Jr. et al. |
| 3,873,796 A | 3/1975 | Worobec, Jr. |
| 3,923,126 A | 12/1975 | Bidanset |
| 3,934,345 A | 1/1976 | Hirschkoff |
| 3,937,306 A | 2/1976 | Naslund et al. |
| 3,958,680 A | 5/1976 | Armbruster et al. |
| 3,964,333 A | 6/1976 | Hirschkoff |
| 3,991,469 A | 11/1976 | Frederickson |
| 3,991,864 A | 11/1976 | Muller |
| 3,992,779 A | 11/1976 | Marks et al. |
| 4,018,292 A | 4/1977 | Roll et al. |
| 4,026,392 A | 5/1977 | Hirschkoff |
| 4,057,900 A | 11/1977 | Nagy et al. |
| 4,059,895 A | 11/1977 | Hirschkoff |
| 4,077,125 A | 3/1978 | Fuller |
| 4,091,896 A | 5/1978 | Wieland et al. |
| 4,121,339 A | 10/1978 | Nikolich |
| 4,126,928 A | 11/1978 | Hoff |
| 4,140,209 A | 2/1979 | Muller |
| 4,152,833 A | 5/1979 | Phillips |
| 4,156,477 A | 5/1979 | Nagashima et al. |
| 4,159,049 A | 6/1979 | Merz |
| 4,188,719 A | 2/1980 | Hoff |
| 4,197,640 A | 4/1980 | Murray |
| 4,219,932 A | 9/1980 | Nagashima et al. |
| 4,226,021 A | 10/1980 | Hoff |
| 4,246,701 A | 1/1981 | Johansson |
| 4,267,914 A | 5/1981 | Saar |
| 4,302,879 A | 12/1981 | Murray |
| 4,310,972 A | 1/1982 | Isberg et al. |
| 4,324,045 A | 4/1982 | Hoppner et al. |
| 4,328,617 A | 5/1982 | Satoh |
| 4,334,357 A | 6/1982 | Baricevic |
| 4,335,514 A | 6/1982 | Overy et al. |
| 4,335,585 A | 6/1982 | Hoff |
| 4,353,163 A | 10/1982 | Overbury et al. |
| 4,367,813 A | 1/1983 | Wieland et al. |
| 4,370,810 A | 2/1983 | Schurr et al. |
| 4,385,442 A | 5/1983 | Nitschmann et al. |
| 4,402,138 A | 9/1983 | Glockle et al. |
| 4,406,645 A | 9/1983 | Dynie et al. |
| 4,420,885 A | 12/1983 | Todero |
| 4,426,563 A | 1/1984 | Grogan |
| 4,432,139 A | 2/1984 | Kohler et al. |
| 4,434,556 A | 3/1984 | Nitschmann et al. |
| 4,460,072 A | 7/1984 | Morner et al. |
| 4,474,269 A | 10/1984 | Kloberg et al. |
| 4,493,400 A | 1/1985 | Nagashima et al. |
| 4,534,005 A | 8/1985 | Nagashima et al. |
| 4,543,723 A | 10/1985 | Bortfeld et al. |
| 4,553,326 A | 11/1985 | West |
| 4,560,040 A | 12/1985 | Morner et al. |
| 4,567,658 A | 2/1986 | Wissmann et al. |
| 4,574,481 A | 3/1986 | Ericsson |
| 4,586,101 A | 4/1986 | Vogelgesang |
| 4,586,588 A | 5/1986 | Nagashima et al. |
| 4,593,796 A | 6/1986 | Farquhar |
| 4,594,780 A | 6/1986 | Schliemann et al. |
| 4,625,406 A | 12/1986 | Fushiya et al. |
| 4,635,364 A | 1/1987 | Noll et al. |
| 4,651,423 A | 3/1987 | Grogan |
| 4,653,189 A | 3/1987 | Andreasson |
| 4,656,985 A | 4/1987 | Andreasson et al. |
| 4,662,072 A | 5/1987 | Wieland et al. |
| 4,680,862 A | 7/1987 | Wieland et al. |
| 4,683,660 A | 8/1987 | Schurr |
| 4,716,654 A | 1/1988 | Wallmark |
| 4,721,193 A | 1/1988 | Nagashima |
| 4,753,012 A | 6/1988 | Schurr |
| 4,757,881 A | 7/1988 | Jonsson et al. |
| 4,782,593 A | 11/1988 | Kieser et al. |
| 4,793,064 A | 12/1988 | Nagashima |
| 4,802,555 A | 2/1989 | Matsunaga et al. |
| 4,811,487 A | 3/1989 | Takahashi et al. |
| 4,817,291 A | 4/1989 | Stehle |
| 4,841,641 A | 6/1989 | Laidlaw |
| 4,882,844 A | 11/1989 | Stokan |
| 4,920,649 A | 5/1990 | Strom et al. |
| 4,949,818 A | 8/1990 | Siede |
| 4,964,217 A | 10/1990 | Siede et al. |
| 4,999,918 A | 3/1991 | Schliemann et al. |
| 5,018,492 A | 5/1991 | Wolf et al. |
| 5,101,567 A | 4/1992 | Cool |
| 5,125,160 A | 6/1992 | Gassen |
| 5,184,403 A | 2/1993 | Schliemann |
| 5,233,750 A | 8/1993 | Wolf et al. |
| 5,257,568 A | 11/1993 | Nitschmann |
| 5,272,813 A | 12/1993 | Wolf et al. |
| 5,305,528 A * | 4/1994 | Garrison ............... B27B 17/083 30/216 |
| 5,345,686 A | 9/1994 | Zimmermann |
| 5,353,506 A | 10/1994 | Muller et al. |
| 5,411,382 A | 5/1995 | Duensing |
| 5,480,009 A | 1/1996 | Wieland et al. |
| 5,491,899 A | 2/1996 | Schliemann et al. |
| 5,503,255 A | 4/1996 | Martinsson et al. |
| 5,522,143 A | 6/1996 | Schliemann et al. |
| 5,595,153 A | 1/1997 | Hoppner et al. |
| 5,638,945 A | 6/1997 | Fukinuki et al. |
| 5,685,080 A | 11/1997 | Amano et al. |
| 5,709,032 A | 1/1998 | Mizutani et al. |
| 5,791,057 A | 8/1998 | Nakamura et al. |
| 5,813,123 A | 9/1998 | Wieland et al. |
| 5,813,663 A | 9/1998 | Victor et al. |
| 5,915,795 A | 6/1999 | Nakamura et al. |
| 5,942,975 A | 8/1999 | Sorensen |
| 5,960,549 A | 10/1999 | Hoppner |
| 5,984,054 A | 11/1999 | Martinsson |
| 6,076,306 A | 6/2000 | Victor et al. |
| 6,185,875 B1 | 2/2001 | Victor et al. |
| 6,247,624 B1 | 6/2001 | Rundberg |
| 6,256,890 B1 | 7/2001 | Schliemann et al. |
| 6,308,606 B1 | 10/2001 | Buchholtz et al. |
| RE37,832 E | 9/2002 | Nakamura et al. |
| 6,490,795 B1 | 12/2002 | Krahn |
| 6,493,948 B2 | 12/2002 | Luegger et al. |
| 6,493,949 B2 | 12/2002 | Kondo et al. |
| 6,575,285 B2 | 6/2003 | Jong |
| D481,601 S | 11/2003 | Ashfield |
| 6,640,444 B1 | 11/2003 | Harada et al. |
| 6,742,265 B2 | 6/2004 | Radel et al. |
| 6,769,187 B2 | 8/2004 | King |
| 6,842,987 B1 | 1/2005 | Martinsson et al. |
| 6,878,888 B1 | 4/2005 | Jong |
| 6,944,958 B1 | 9/2005 | King |
| 7,178,248 B2 | 2/2007 | Richards |
| 7,200,941 B2 | 4/2007 | Myers |
| 7,293,330 B2 | 11/2007 | Guip et al. |
| 7,316,299 B1 | 1/2008 | Chung Lee |
| 7,331,111 B2 | 2/2008 | Myers |
| 7,412,769 B1 | 8/2008 | King |
| 7,520,690 B2 | 4/2009 | Kobayashi et al. |
| 7,617,809 B2 | 11/2009 | Jesse |
| 7,640,669 B1 | 1/2010 | King |

(56) References Cited

U.S. PATENT DOCUMENTS

| | | |
|---|---|---|
| 7,958,642 B2 | 6/2011 | Rosskamp |
| 8,100,234 B2 | 1/2012 | Stehle et al. |
| 8,132,484 B2 | 3/2012 | Pfleiderer et al. |
| 8,136,256 B2 | 3/2012 | Wolf et al. |
| 8,176,643 B2 | 5/2012 | Harada |
| 8,225,907 B2 | 7/2012 | Soucy et al. |
| 8,256,396 B2 | 9/2012 | Emmerich et al. |
| 8,286,359 B2 | 10/2012 | Ashfield |
| 8,353,110 B2 | 1/2013 | Galster |
| 8,353,362 B2 | 1/2013 | Liebhard et al. |
| 8,371,421 B2 | 2/2013 | Jesse et al. |
| 8,397,691 B2 | 3/2013 | Osawa et al. |
| 8,528,217 B2 | 9/2013 | Kondo et al. |
| 8,579,041 B2 | 11/2013 | Pellenc |
| 8,601,919 B1 | 12/2013 | King |
| 8,615,889 B2 | 12/2013 | Martinsson |
| 8,615,890 B2 | 12/2013 | Wolf et al. |
| 8,627,572 B2 | 1/2014 | Martinsson et al. |
| 8,661,694 B2 | 3/2014 | Bijsterveldt et al. |
| 8,661,951 B2 | 3/2014 | Gorenflo |
| 8,740,529 B2 | 6/2014 | Martinsson et al. |
| 8,747,281 B2 | 6/2014 | Lindblad et al. |
| 8,757,288 B2 | 6/2014 | Heinzelmann et al. |
| 8,813,374 B2 | 8/2014 | Lank et al. |
| 8,833,221 B2 | 9/2014 | Tomita et al. |
| 8,833,485 B2 | 9/2014 | Svennung et al. |
| 8,869,787 B2 | 10/2014 | Thölking et al. |
| 8,869,912 B2 | 10/2014 | Roßkamp et al. |
| 8,904,651 B2 | 12/2014 | Heinzelmann |
| 8,910,840 B2 | 12/2014 | Kamo et al. |
| 8,960,178 B2 | 2/2015 | Buchholtz et al. |
| 8,973,276 B2 | 3/2015 | Van Bijsterveldt et al. |
| 9,044,875 B2 | 6/2015 | Shimizu et al. |
| D738,175 S | 9/2015 | Tinius |
| 9,119,354 B2 | 9/2015 | Stevenson et al. |
| 9,138,846 B2 | 9/2015 | Svennung et al. |
| 9,138,912 B2 | 9/2015 | Kapinsky et al. |
| 9,156,183 B2 | 10/2015 | Andersson et al. |
| 9,204,707 B2 | 12/2015 | Ito et al. |
| 9,224,995 B2 | 12/2015 | Martinsson et al. |
| 9,306,478 B2 | 4/2016 | Kischka et al. |
| 9,308,637 B2 | 4/2016 | Tsuchiya et al. |
| 9,381,665 B2 | 7/2016 | Onose et al. |
| 9,393,712 B2 | 7/2016 | Yoneyama et al. |
| 9,470,143 B2 | 10/2016 | Karrar et al. |
| 9,486,867 B2 | 11/2016 | Etou et al. |
| 9,506,486 B2 | 11/2016 | Stieler |
| 9,572,302 B2 | 2/2017 | Rosskamp |
| 9,573,208 B2 | 2/2017 | Takayanagi et al. |
| 9,624,993 B2 | 4/2017 | Apfel et al. |
| 9,657,867 B2 | 5/2017 | Zurawski |
| 9,713,880 B2 | 7/2017 | Haneda et al. |
| 9,713,881 B2 | 7/2017 | Zimmermann et al. |
| 9,769,187 B2 | 9/2017 | Khalil et al. |
| 9,815,220 B2 | 11/2017 | Madson |
| 9,943,039 B2 | 4/2018 | Rosskamp |
| 9,993,937 B2 | 6/2018 | Wolf et al. |
| 10,039,367 B2 | 8/2018 | Yamaoka et al. |
| 10,105,832 B2 | 10/2018 | Martinsson et al. |
| 10,144,146 B2 | 12/2018 | Frey et al. |
| 10,166,691 B2 | 1/2019 | Föhrenbach et al. |
| 10,174,782 B2 | 1/2019 | Kawamura et al. |
| 10,213,936 B2 | 2/2019 | Bergquist |
| 10,259,135 B2 | 4/2019 | Pellenc |
| 10,328,600 B2 | 6/2019 | Kachi et al. |
| 10,371,044 B2 | 8/2019 | Karrar et al. |
| 10,406,173 B2 | 9/2019 | Wilson et al. |
| 10,406,713 B2 | 9/2019 | Haneda et al. |
| 10,427,317 B2 | 10/2019 | Martinsson et al. |
| 10,717,206 B2 | 7/2020 | Weinig et al. |
| 10,730,156 B2 | 8/2020 | Gorenflo |
| 10,814,518 B2 | 10/2020 | Gerstenberger et al. |
| 2003/0070308 A1 | 4/2003 | Ohsawa et al. |
| 2004/0181951 A1 | 9/2004 | Wittke |
| 2005/0025636 A1 | 2/2005 | Durr |
| 2005/0210685 A1 | 9/2005 | Jong |
| 2006/0102437 A1 | 5/2006 | Nara et al. |
| 2006/0175174 A1 | 8/2006 | Lee |
| 2007/0205237 A1 | 9/2007 | Machens et al. |
| 2008/0092399 A1 | 4/2008 | Myers |
| 2009/0090754 A1 | 4/2009 | Haberlein |
| 2009/0090755 A1 | 4/2009 | Menzel et al. |
| 2010/0043234 A1 | 2/2010 | Pellenc |
| 2010/0146800 A1 | 6/2010 | Carlson et al. |
| 2010/0206278 A1 | 8/2010 | Emmerich et al. |
| 2010/0218386 A1 | 9/2010 | Roßkamp et al. |
| 2010/0218388 A1 | 9/2010 | Myers |
| 2011/0005088 A1 | 1/2011 | Pellenc |
| 2011/0162219 A1 | 7/2011 | Okouchi |
| 2012/0036725 A1 | 2/2012 | Osborne et al. |
| 2012/0055034 A1 | 3/2012 | Andersson et al. |
| 2012/0067931 A1 | 3/2012 | Yanosick |
| 2012/0102765 A1 | 5/2012 | Andersson et al. |
| 2012/0324743 A1 | 12/2012 | Bergquist et al. |
| 2014/0047722 A1 | 2/2014 | Onose et al. |
| 2014/0054054 A1 | 2/2014 | Osborne et al. |
| 2014/0109416 A1 | 4/2014 | Martinsson |
| 2014/0173917 A1 | 6/2014 | Van Bijsterveldt et al. |
| 2014/0298664 A1 | 10/2014 | Van Bijsterveldt et al. |
| 2014/0310965 A1 | 10/2014 | Van Bijsterveldt et al. |
| 2015/0135542 A1 | 5/2015 | Cook |
| 2015/0251258 A1 | 9/2015 | Jiang et al. |
| 2017/0100852 A1 | 4/2017 | Galster |
| 2017/0239835 A1 | 8/2017 | Ebner |
| 2017/0259359 A1 | 9/2017 | Kachi et al. |
| 2018/0200917 A1* | 7/2018 | Kachi ................ B27B 17/0008 |
| 2018/0206620 A1 | 7/2018 | Yamaoka et al. |
| 2018/0215002 A1 | 8/2018 | Gorenflo |
| 2019/0030746 A1 | 1/2019 | Naganuma |
| 2019/0111582 A1 | 4/2019 | Suzuki et al. |
| 2019/0217496 A1 | 7/2019 | Shibata et al. |
| 2019/0262753 A1 | 8/2019 | Miura et al. |
| 2019/0381649 A1 | 12/2019 | Peng et al. |
| 2019/0381687 A1 | 12/2019 | Haneda et al. |
| 2020/0306847 A1 | 10/2020 | Osawa et al. |
| 2020/0338780 A1 | 10/2020 | Watanabe et al. |
| 2020/0370589 A1 | 11/2020 | Posner |
| 2020/0384664 A1* | 12/2020 | Yang .................... B27B 17/083 |
| 2023/0264337 A1* | 8/2023 | Suzuki .................... B25F 5/02 |
| | | 173/217 |

FOREIGN PATENT DOCUMENTS

| | | |
|---|---|---|
| CN | 201102268 Y | 8/2008 |
| CN | 201128033 Y | 10/2008 |
| CN | 201235565 Y | 5/2009 |
| CN | 201427336 Y | 3/2010 |
| CN | 203077410 U | 7/2013 |
| CN | 103317561 A | 9/2013 |
| CN | 203261833 U | 11/2013 |
| CN | 203492442 U | 3/2014 |
| CN | 203505149 U | 4/2014 |
| CN | 203592525 U | 5/2014 |
| CN | 104082052 A | 10/2014 |
| CN | 104094782 A | 10/2014 |
| CN | 103299835 B | 12/2014 |
| CN | 103419251 B | 12/2014 |
| CN | 204149261 U | 2/2015 |
| CN | 204322203 U | 5/2015 |
| CN | 204367083 U | 6/2015 |
| CN | 105082261 A | 11/2015 |
| CN | 204741936 U | 11/2015 |
| CN | 204772825 U | 11/2015 |
| CN | 303638785 S | 4/2016 |
| CN | 205232893 U | 5/2016 |
| CN | 205438783 U | 8/2016 |
| CN | 106106033 A | 11/2016 |
| CN | 106827084 A | 6/2017 |
| CN | 206442841 U | 8/2017 |
| CN | 107470962 A | 12/2017 |
| CN | 107856130 A | 3/2018 |
| CN | 207402908 U | 5/2018 |
| CN | 108124628 A | 6/2018 |
| CN | 207534974 U | 6/2018 |

(56) References Cited

FOREIGN PATENT DOCUMENTS

| | | |
|---|---|---|
| CN | 207841595 U | 9/2018 |
| CN | 106078932 B | 4/2019 |
| CN | 109968458 A | 7/2019 |
| CN | 110131560 A | 8/2019 |
| CN | 209394795 U | 9/2019 |
| CN | 209449299 U | 10/2019 |
| CN | 211640241 U | 10/2020 |
| CN | 211671504 U | 10/2020 |
| CN | 212888046 U | 4/2021 |
| DE | 571469 C | 3/1933 |
| DE | 827253 C | 1/1952 |
| DE | 850803 C | 9/1952 |
| DE | 928671 C | 6/1955 |
| DE | 1173229 B | 7/1964 |
| DE | 1191954 B | 4/1965 |
| DE | 1195462 B | 6/1965 |
| DE | 7526726 U | 12/1975 |
| DE | 2537642 A1 | 3/1977 |
| DE | 2610085 A1 | 9/1977 |
| DE | 2909777 A1 | 9/1980 |
| DE | 4125846 A1 | 2/1983 |
| DE | 3150769 A1 | 6/1983 |
| DE | 2816485 C2 | 9/1983 |
| DE | 3308400 A1 | 9/1983 |
| DE | 8208993 U1 | 9/1983 |
| DE | 3035185 C2 | 10/1984 |
| DE | 3322372 A1 | 1/1985 |
| DE | 3436121 A1 | 5/1985 |
| DE | 3407625 A1 | 8/1985 |
| DE | 8306837 U1 | 3/1986 |
| DE | 3438906 A1 | 4/1986 |
| DE | 3608523 A1 | 9/1987 |
| DE | 3639650 A1 | 6/1988 |
| DE | 3721643 A1 | 1/1989 |
| DE | 3915293 A1 | 12/1989 |
| DE | 4137177 A1 | 5/1992 |
| DE | 4137409 A1 | 5/1993 |
| DE | 4222075 A1 | 1/1994 |
| DE | 9212059 U1 | 1/1994 |
| DE | 9212060 U1 | 1/1994 |
| DE | 4416044 C2 | 8/1996 |
| DE | 19524259 A1 | 1/1997 |
| DE | 29519574 U1 | 4/1997 |
| DE | 19635120 C1 | 4/1998 |
| DE | 19812860 A1 | 9/1999 |
| DE | 29909645 U1 | 9/1999 |
| DE | 19844016 A1 | 3/2000 |
| DE | 19931251 A1 | 1/2001 |
| DE | 19940493 A1 | 3/2001 |
| DE | 20118378 U1 | 2/2002 |
| DE | 202004004216 U1 | 5/2004 |
| DE | 202004004467 U1 | 5/2004 |
| DE | 202004005276 U1 | 5/2004 |
| DE | 202004010208 U1 | 9/2004 |
| DE | 10361098 A1 | 7/2005 |
| DE | 102004020421 B4 | 11/2005 |
| DE | 102005024986 A1 | 12/2006 |
| DE | 202005013556 U1 | 1/2007 |
| DE | 202006019557 U1 | 3/2007 |
| DE | 102006038333 A1 | 2/2008 |
| DE | 102007035822 A1 | 2/2009 |
| DE | 202011051057 U1 | 11/2011 |
| DE | 202014100966 U1 | 3/2014 |
| DE | 102013212637 A1 | 12/2014 |
| DE | 202014009972 U1 | 1/2015 |
| DE | 202013105016 U1 | 2/2015 |
| DE | 202013105784 U1 | 3/2015 |
| DE | 102016105226 A1 | 9/2016 |
| DE | 102016008496 A1 | 1/2018 |
| DE | 202019002700 U1 | 9/2019 |
| EP | 0076002 A2 | 4/1983 |
| EP | 0236749 B1 | 9/1993 |
| EP | 0440827 B1 | 7/1994 |
| EP | 0677361 A1 | 10/1995 |
| EP | 0945234 A2 | 9/1999 |
| EP | 1131994 A1 | 9/2001 |
| EP | 1350607 B1 | 5/2005 |
| EP | 1468796 B1 | 6/2006 |
| EP | 1749626 A1 | 2/2007 |
| EP | 2404722 A1 | 1/2012 |
| EP | 2447022 B1 | 3/2013 |
| EP | 2230056 B1 | 2/2016 |
| EP | 2416932 B1 | 6/2016 |
| EP | 3034255 B1 | 4/2017 |
| EP | 2465654 B1 | 7/2017 |
| EP | 2110214 B1 | 8/2017 |
| EP | 3150333 B1 | 8/2019 |
| EP | 3546162 A1 | 10/2019 |
| GB | 2336987 A | 11/1999 |
| WO | WO9413441 A2 | 6/1994 |
| WO | WO2004078434 A1 | 9/2004 |
| WO | WO2004091873 A1 | 10/2004 |
| WO | WO2005099981 A1 | 10/2005 |
| WO | WO2006057589 A1 | 6/2006 |
| WO | WO2010134395 A1 | 11/2010 |
| WO | WO2012025458 A1 | 3/2012 |
| WO | WO2013032372 A1 | 3/2013 |
| WO | WO2014119174 A1 | 8/2014 |
| WO | WO2014142862 A1 | 9/2014 |
| WO | WO2015057117 A1 | 4/2015 |
| WO | WO2015133940 A1 | 9/2015 |
| WO | WO2016024486 A1 | 2/2016 |
| WO | WO2016152227 A1 | 9/2016 |

OTHER PUBLICATIONS

International Preliminary Report on Patentability for Application No. PCT/US2021/048828 dated Mar. 16, 2023 (7 pages).

* cited by examiner

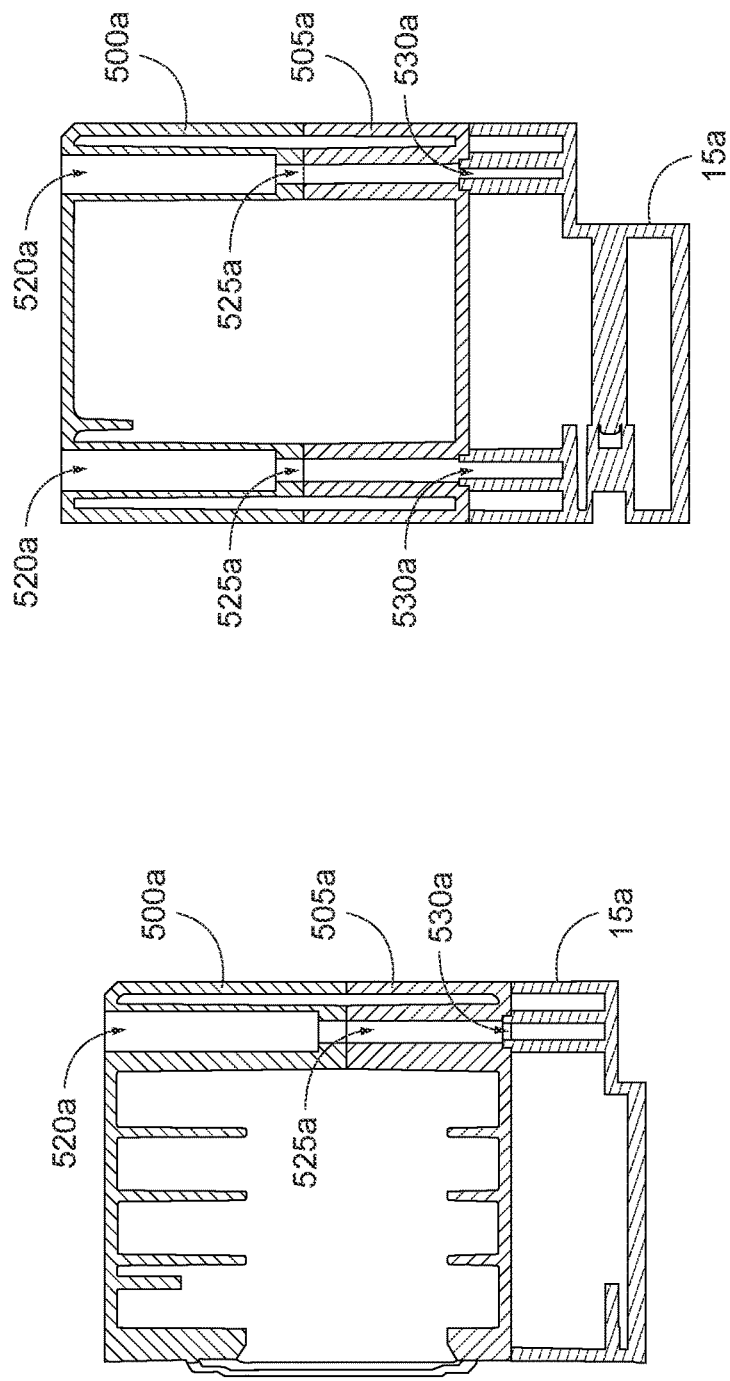
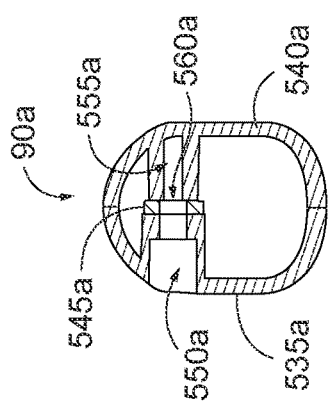
FIG. 20
FIG. 21
FIG. 22

CHAINSAW

CROSS-REFERENCE TO RELATED APPLICATIONS

This application claims priority to U.S. Provisional Patent Application No. 63/074,949 filed on Sep. 4, 2020, U.S. Provisional Patent Application No. 63/109,594 filed on Nov. 4, 2020, and U.S. Provisional Patent Application No. 63/146,371 filed on Feb. 5, 2021, the contents of each of which are incorporated herein by reference.

FIELD OF THE DISCLOSURE

The present disclosure relates to chainsaws, and more particularly to electric chainsaws including removable battery packs.

SUMMARY

In one aspect, a power tool includes a housing, a battery pack selectively coupled to the housing, and a motor supported within the housing. The motor is electrically coupled to the battery pack when the battery pack is coupled to the housing. The power tool includes a switch supported within the housing. The switch is moveable between a first position enabling activation of the motor by the battery pack and a second position disabling the motor. The power tool includes a trigger movably coupled to the housing between an OFF position and an ON position. The switch moves from the second position to the first position in response to the trigger moving from the OFF position to the ON position. The power tool includes a trigger lock-off pivotably coupled to the housing between a lock position and an unlock position. The trigger lock-off is engageable with the trigger to inhibit movement of the trigger from the OFF position to the ON position when the trigger lock-off is in the lock position. The trigger lock-off allows movement of the trigger from the OFF position to the ON position when the trigger lock-off is in the unlock position.

In another aspect, a power tool includes a housing having a handle, a motor supported within a portion of the housing, and a switch supported within the handle. The switch is moveable between a first position enabling activation of the motor and a second position disabling the motor. The power tool includes a trigger movably coupled to the handle between an OFF position and an ON position. The switch moves from the second position to the first position in response to the trigger moving from the OFF position to the ON position. The trigger includes a resilient protrusion that moves with the trigger between the OFF position and the ON position. The power tool includes a trigger lock-off pivotably coupled to the handle between a lock position and an unlock position. The trigger lock-off is engageable with the resilient protrusion to inhibit movement of the trigger from the OFF position to the ON position when the trigger lock-off is in the lock position. The trigger lock-off allows movement of the trigger from the OFF position to the ON position when the trigger lock-off is in the unlock position.

In yet another aspect, a power tool includes a housing having a handle, a motor supported within a portion of the housing, and a switch supported within the handle. The switch includes a plunger moveable between a first position enabling activation of the motor and a second position disabling the motor. The power tool includes a trigger pivotably coupled to the handle about a pivot axis between an OFF position and an ON position. The trigger includes an arm and an engagement surface. The pivot axis is positioned between the arm and the engagement surface. The arm is engageable with the plunger. The engagement surface is configured to be engaged by an operator to move the trigger from the OFF position toward the ON position. The trigger includes a resilient protrusion that moves with the trigger between the OFF position and the ON position. The power tool includes a trigger lock-off pivotably coupled to the handle between a lock position and an unlock position. The trigger lock-off is engageable with the resilient protrusion to inhibit movement of the trigger from the OFF position to the ON position when the trigger lock-off is in the lock position. The trigger lock-off allows movement of the trigger from the OFF position to the ON position when the trigger lock-off is in the unlock position. The plunger biases the trigger from the ON position toward the OFF position. A biasing force of the resilient protrusion against the trigger lock-off assists the plunger in biasing the trigger from the ON position toward the OFF position when the trigger lock-off is in the locked position.

In yet another aspect, a power tool includes at least one of a two-piece battery interface configured to support a battery pack to the power tool, a hanging hook operable to support the power tool on a support member, a brake assembly configured to stop movement of a cutting chain of the power tool, a handle including a flat portion configured to engage a support surface to support the power tool at an angle relative to the support surface, a lubricant pump system operable to provide a lubricant to the cutting chain during operation of the power tool, and a cover assembly operable to couple a guide bar that supports a cutting chain to a housing of the power tool.

Other aspects of the disclosure will become apparent by consideration of the detailed description and accompanying drawings.

BRIEF DESCRIPTION OF THE DRAWINGS

FIG. 20 is a cross sectional view of the chainsaw of FIG. 18 taken along line 20-20.

FIG. 21 is a cross sectional view of the chainsaw of FIG. 18 taken along line 21-21.

FIG. 22 is a cross sectional view of the chainsaw of FIG. 18 taken along line 22-22.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and being practiced or being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described embodiments.

Figure 1:
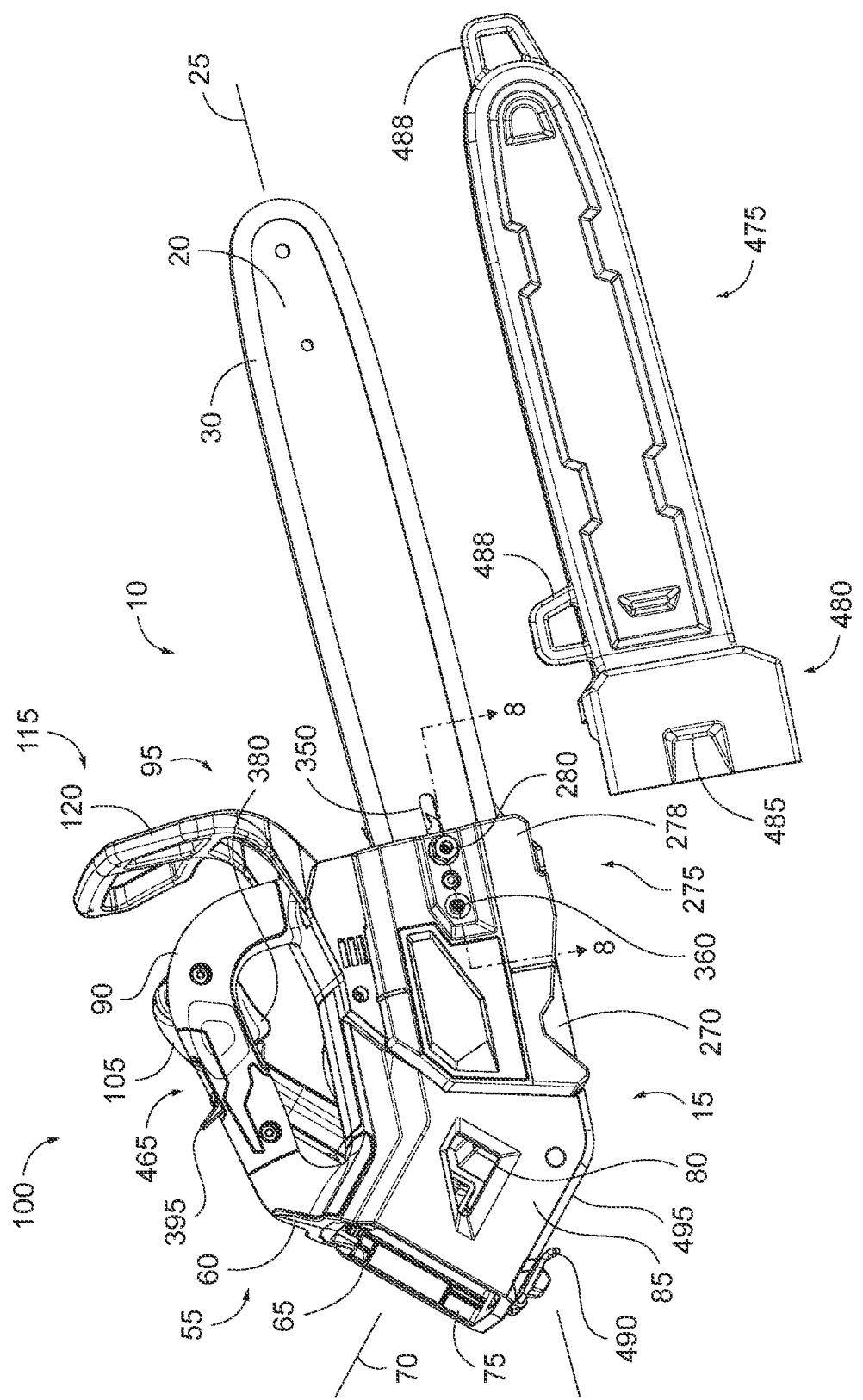
FIG. 1 is a first perspective view of a chainsaw according to an embodiment.
Figure 2:
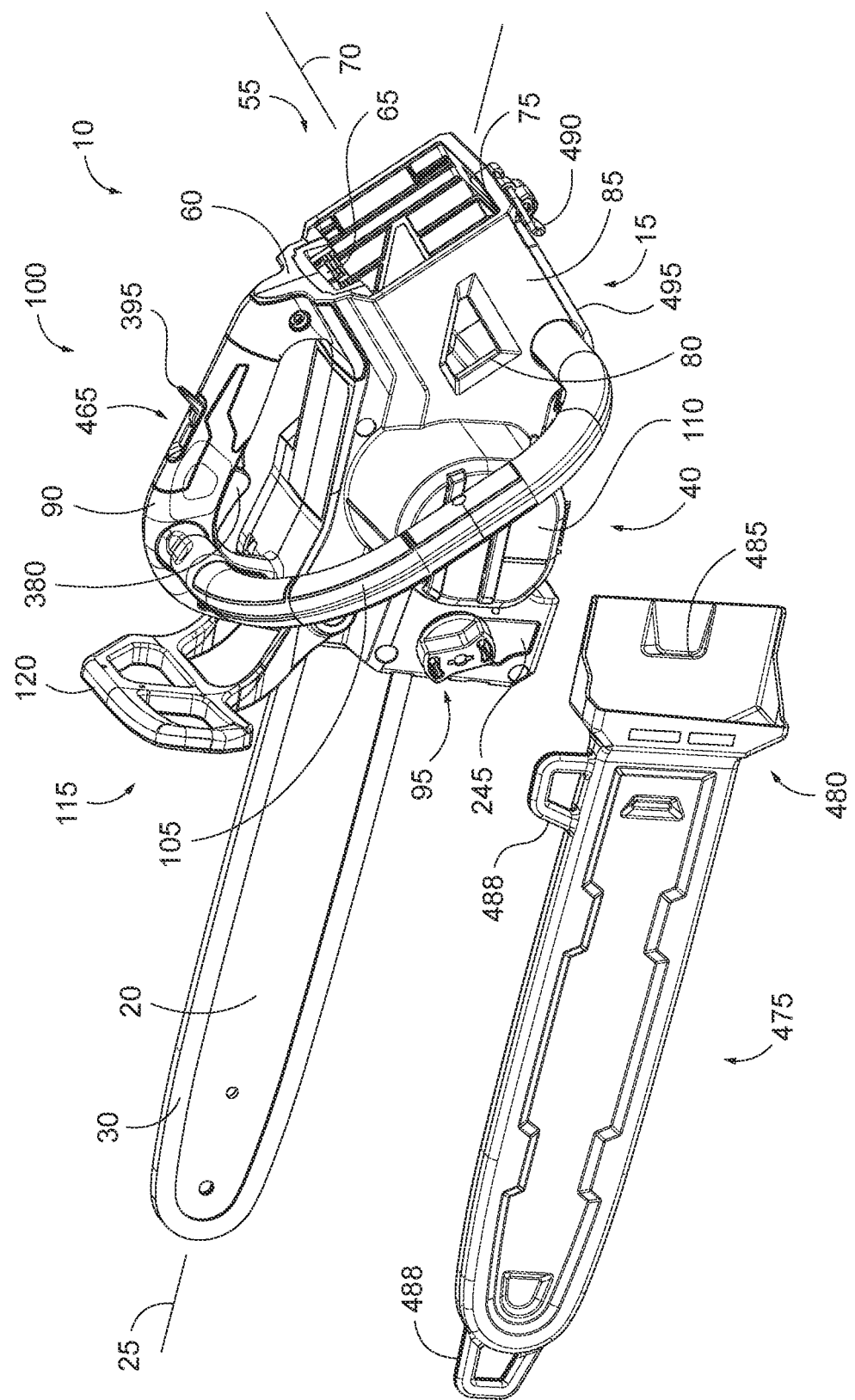
FIG. 2 is a second perspective view of the chainsaw of FIG. 1.

FIGS. 1 and 2 illustrate a portable outdoor tool, such as a portable chainsaw 10. The chainsaw 10 includes a housing 15 and a guide bar 20 selectively coupled to the housing 15. The guide bar 20 has a longitudinal axis 25 and supports a cutting chain 30 that is driven around the guide bar 20 by a power and drive assembly 35. The power and drive assembly 35 includes an electric motor 40 and a geartrain 45 (FIG. 3) supported within the housing 15.

Figure 17:
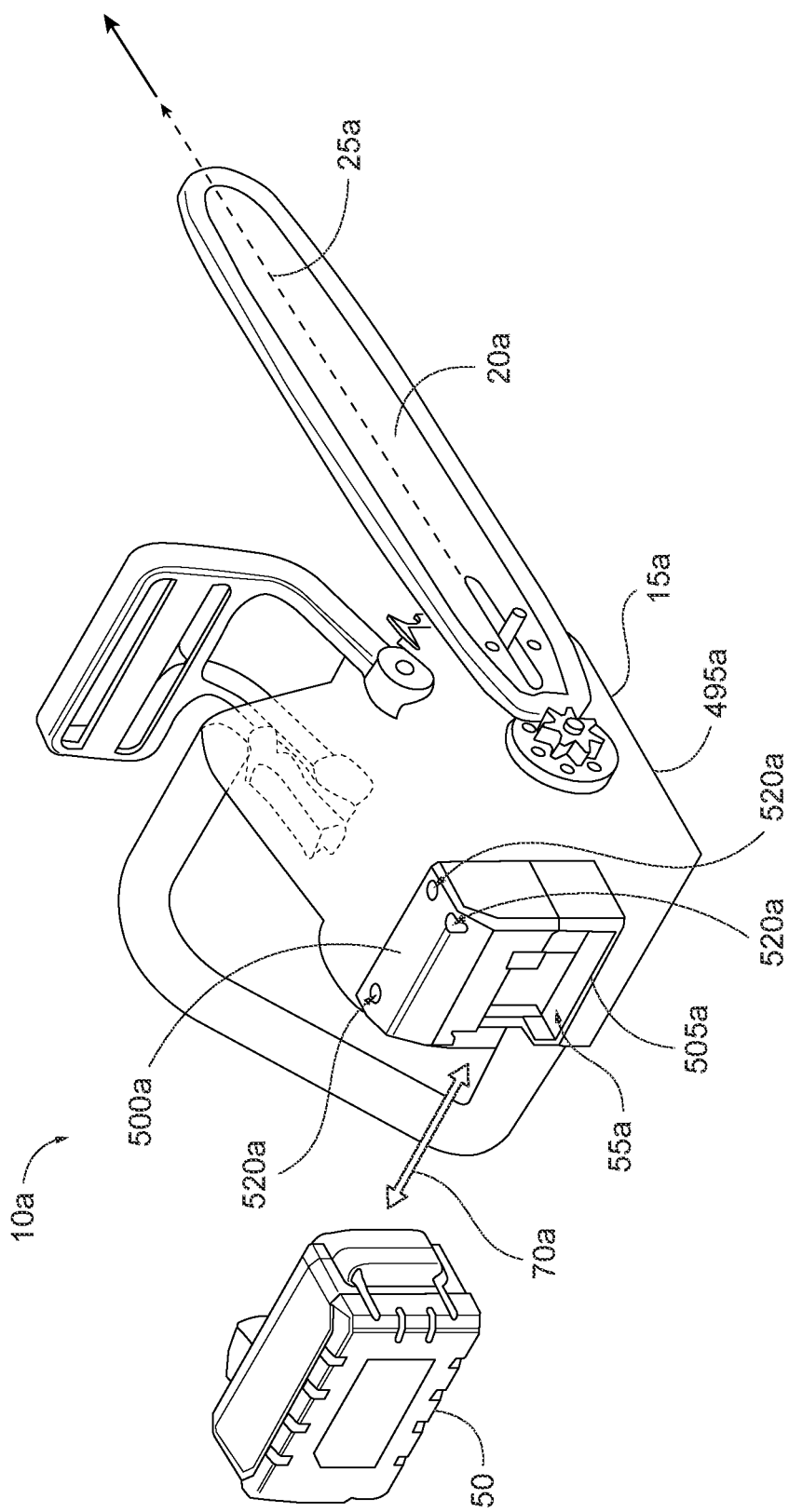
FIG. 17 is a perspective view of a chainsaw according to another embodiment illustrating a battery pack that can be coupled to a battery pack receiving receptacle.
Figure 18:
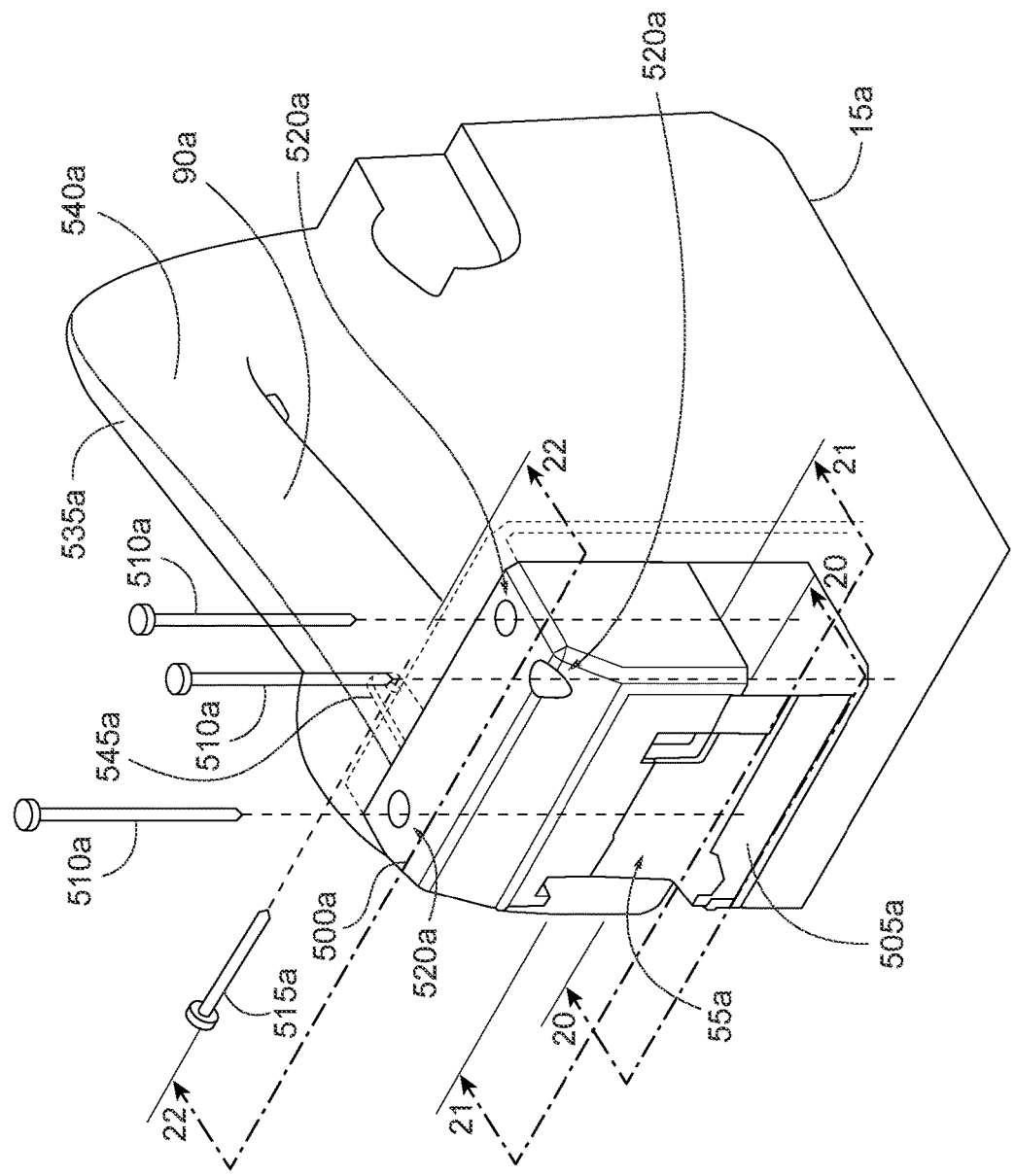
FIG. 18 is a perspective view of a portion of the chainsaw of FIG. 17.

A rechargeable battery pack 50 (FIG. 17) is selectively coupled to the chainsaw 10 for supplying power to the electric motor 40 to drive the geartrain 45. The battery pack 50 may include any of a number of different nominal voltages (e.g., 12V, 18V, etc.), and may be configured having any of a number of different chemistries (e.g., lithium-ion, nickel-cadmium, etc.). In particular, the housing 15 includes a battery pack receiving receptacle 55 formed at a rear portion 60 of the housing 15. The battery pack receiving receptacle 55 includes a battery pack interface 65 positioned on a top surface of the battery pack receiving receptacle 55. The battery pack 50 is selectively coupled to the battery pack interface 65 by moving the battery pack 50 along an insertion axis 70 through an opening 75 of the battery pack receiving receptacle 55. The insertion axis 70 is obliquely oriented relative to the longitudinal axis 25 of the guide bar 20. The battery pack receiving receptacle 55 is sized to accommodate different sized battery packs (e.g., battery packs including different heights). In addition, the battery pack receiving receptacle 55 includes apertures 80 formed through sidewalls 85 of the battery pack receiving receptacle 55. In some embodiments, the apertures 80 allow airflow into and out of the battery pack receiving receptacle 55 to aid in cooling the battery pack 50 during operation. In other embodiments, a cover can be movably coupled to the battery pack receiving receptacle 55 to selectively cover the battery pack 50 and the opening 75 to prevent debris from entering the battery pack receiving receptacle 55 during operation.

Figure 3:
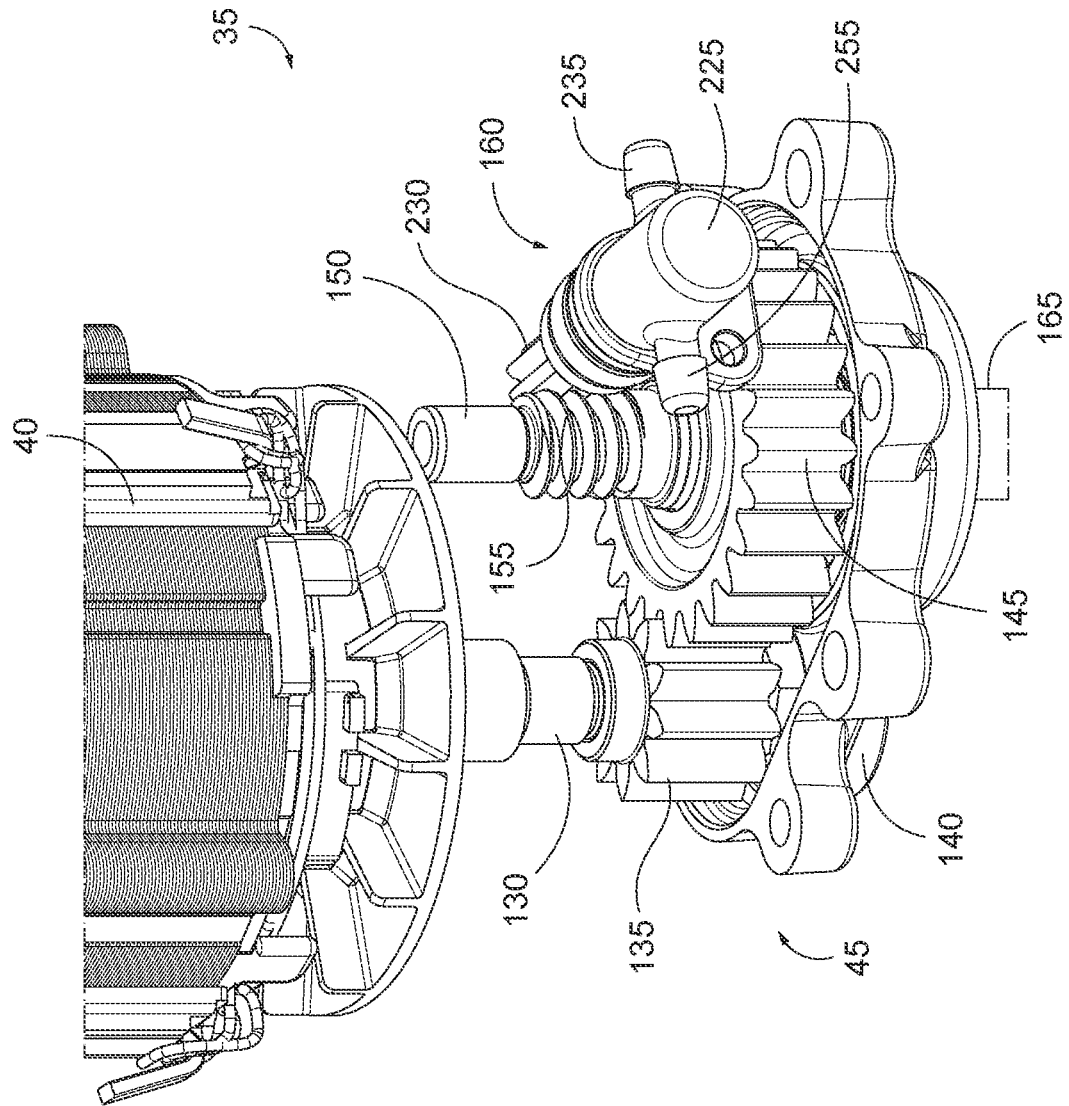
FIG. 3 is a perspective view of a portion of a power and drive assembly of the chainsaw of FIG. 1.
Figure 4:
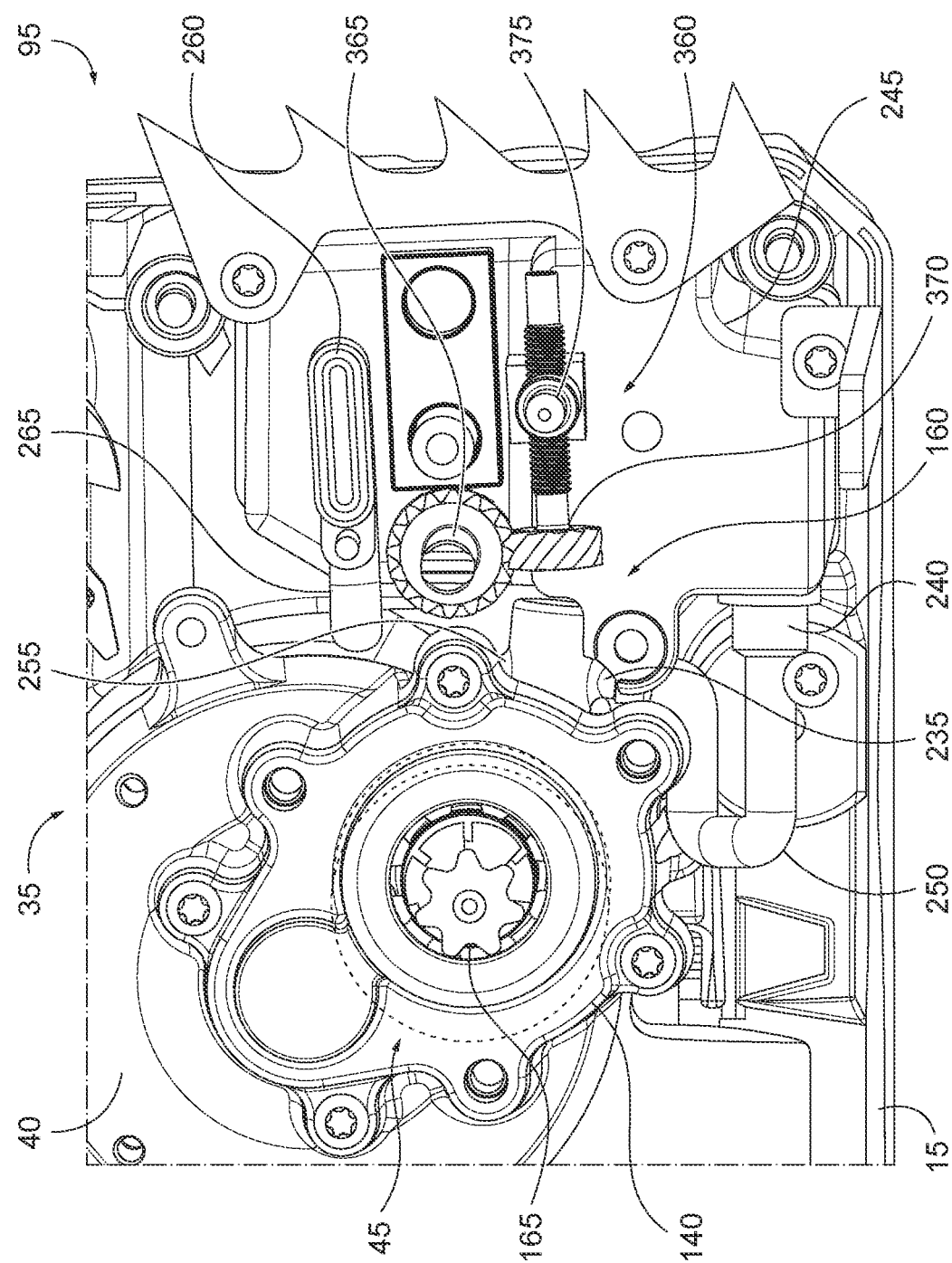
FIG. 4 is a side view of the chainsaw of FIG. 1 with a portion of a housing of the chainsaw removed.
Figure 5:
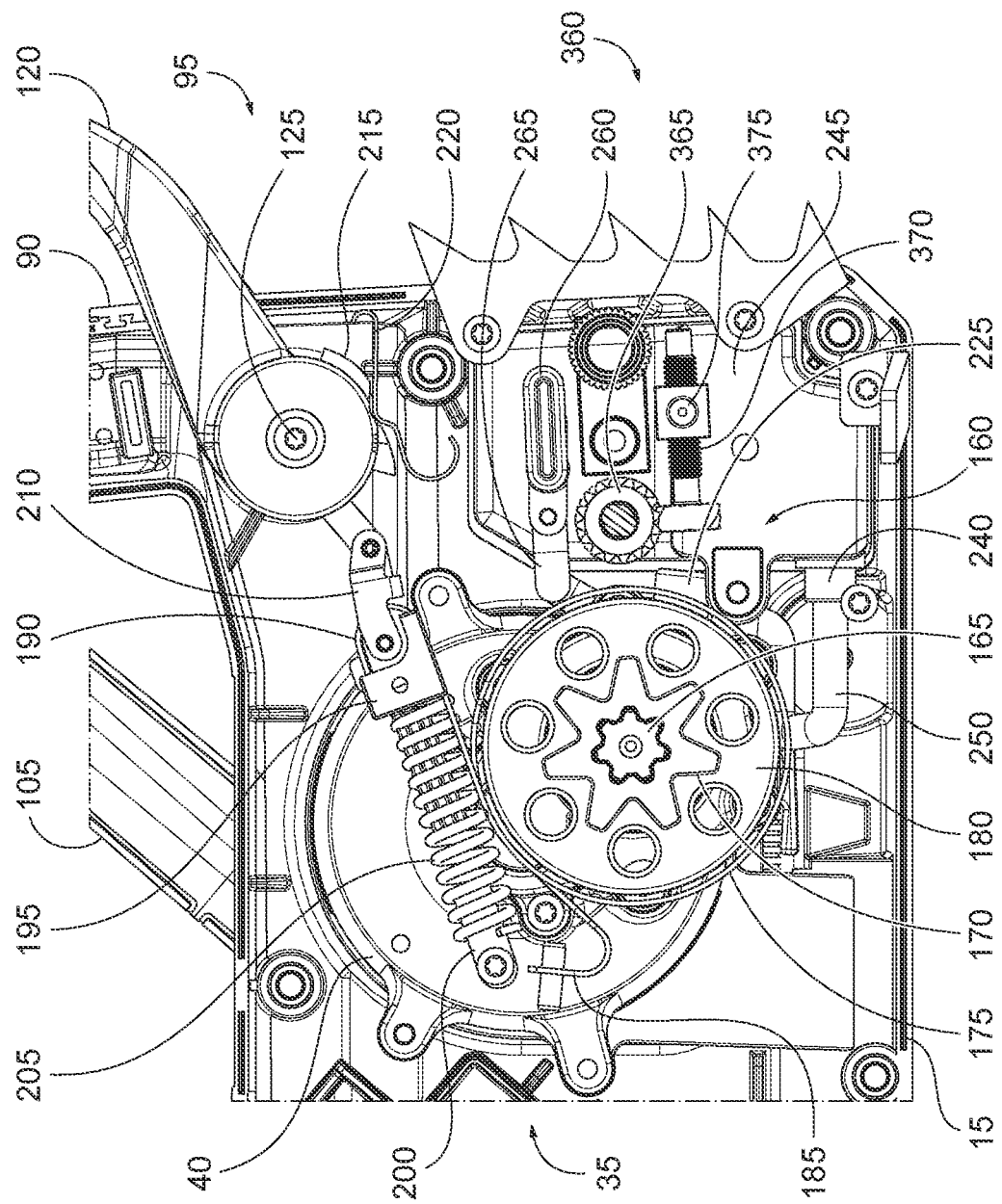
FIG. 5 is a side view of the chainsaw of FIG. 1 illustrating a chain brake in a released state.

With continued reference to FIGS. 1 and 2, the illustrated housing 15 also includes a first handle 90 (e.g., a top handle) coupled between the battery pack receiving receptacle 55 and a front portion 95 of the housing 15. As such, the first handle 90 extends in a direction along the longitudinal axis 25 of the guide bar 20. The first handle 90 includes a trigger assembly 100 operable to actuate the electric motor 40 as discussed in more detail below. In addition, the housing 15 includes a second handle 105 (e.g., an elongated curved bar) coupled between the first handle 90 and a sidewall 85 of the battery pack receiving receptacle 55. The illustrated second handle 105 extends beyond a first side 110 of the housing 15 and includes a central axis that is generally U-shaped. The chainsaw 10 further includes a chain brake 115 having a handguard 120 pivotably coupled to the front portion 95 of the housing 15 about a handguard pivot axis 125. The handguard 120 is located generally between the guide bar 20 and a front portion of the first handle 90. The chain brake 115 is operable to stop the movement of the cutting chain 30 and/or operation of the electric motor 40 during a kickback event as discussed in more detail below:

With reference to FIG. 2, the electric motor 40 is positioned on the first side 110 of the housing 15 coupled to the second handle 105. As shown in FIG. 3, the electric motor 40 includes a motor shaft 130 that drives a first spur gear 135 about a rotational axis of the motor shaft 130. The first spur gear 135 is rotatably supported by the motor shaft 130 and an outer geartrain casing 140. The first spur gear 135 engages a second spur gear 145, which includes a greater diameter than the first spur gear 135. The second spur gear 145 is at least partially supported by the outer geartrain casing 140. In turn, the second spur gear 145 drives a drive shaft 150 with an inboard side of the drive shaft 150 having a worm gear 155 that engages a lubricant pump system 160 and an outboard side 165 of the drive shaft 150 extending beyond the outer geartrain casing 140. With reference to FIGS. 4 and 5, the outboard side 165 of the drive shaft 150 drives an output spindle 170. The output spindle 170 engages the cutting chain 30. Accordingly, the electric motor 40 drives the cutting chain 30 around the guide bar 20 by the output spindle 170.

Figure 6:
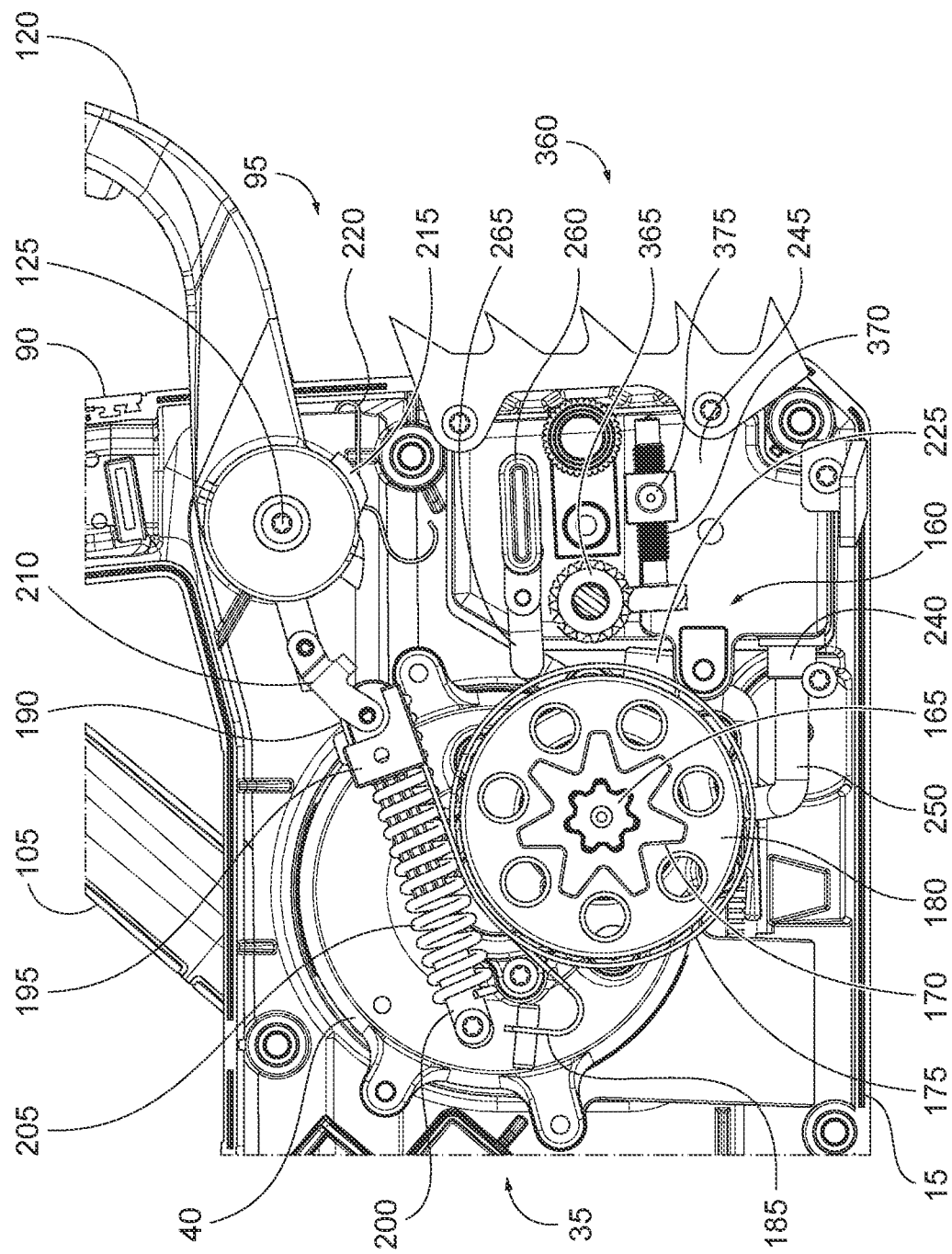
FIG. 6 is a side view of the chainsaw of FIG. 1 illustrating the chain brake in a brake state.

With reference to FIGS. 5 and 6, the output spindle 170 is coupled to the chain brake 115 such that the chain brake 115 is operable to stop rotation of the output spindle 170, which ultimately stops movement of the cutting chain 30 relative to the guide bar 20. The chain brake 115 includes a flexible band 175 extending around a drum 180 of the output spindle 170. A first end 185 of the flexible band 175 is fixed to the housing 15 and a second end 190 of the flexible band 175 is coupled to a first linkage 195 of the chain brake 115. The first linkage 195 is coupled to a support 200 by a compression spring 205 and the support 200 is fixed to the housing 15. The compression spring 205 biases the first linkage 195 away from the support 200. The first linkage 195 is also coupled to the handguard 120 by a second linkage 210 pivotably coupled between the first linkage 195 and the handguard 120.

The chain brake 115 is movable between a released state (FIG. 5) and a brake state (FIG. 6). In the released state, the handguard 120 is in an upright position for the handguard 120 to position the first linkage 195 relative to the support 200 to compress the compression spring 205 between the support 200 and the first linkage 195. As such, the second end 190 of the flexible band 175 is positioned relative to the first end 185 of the flexible band 175 such that the flexible band 175 around the drum 180 flexes radially outwardly to be spaced from the drum 180 of the output spindle 170. In the illustrated embodiment, the second linkage 210 is oriented in an over-center manner relative to the first linkage 195 when in the released state. As such, the biasing force of the compression spring 205 acts to maintain the handguard 120 in the upright position when in the released state (e.g., the compression spring 205 biases the handguard 120 in the counterclockwise direction in the reference frame of FIG. 5). Accordingly, the output spindle 170 can be driven by the electric motor 40 without interference from the flexible band 175.

In the brake state (FIG. 6), the handguard 120 is pivoted into a lowered position (e.g., during a kickback event). In particular, the handguard 120 pivots the second linkage 210 relative to the first linkage 195 (e.g., out of the over-center configuration) allowing the first linkage 195 to move toward the handguard pivot axis 125 of the handguard 120 by the biasing force of the compression spring 205. Movement of the first linkage 195 also moves the second end 190 of the flexible band 175 away from the first end 185 of the flexible band 175. As a result, the flexible band 175 engages the drum 180 of the output spindle 170 and provides a frictional force between the flexible band 175 and the drum 180 to stop rotation of the output spindle 170. In some embodiments, the handguard 120 is engageable with a switch when in the lowered position for the switch to deactivate power to the electric motor 40 to assist the flexible band 175 in stopping movement of the output spindle 170.

In order for the electric motor 40 to drive the output spindle 170 again, the handguard 120 is pivoted back into the upright position (FIG. 5) by the operator. A protrusion 215 that extends from the handguard 120 engages a biasing member 220 coupled to the housing 15 to provide positive feedback to the operator that the handguard 120 is in the upright position. In some embodiments, the engagement between the protrusion 215 and the biasing member 220 helps maintain the handguard 120 in the upright position when in the released state.

With reference back to FIG. 3, the lubricant pump system 160 includes a pump 225 having a spur gear 230 engageable with the worm gear 155 of the drive shaft 150. As shown in FIG. 4, the pump 225 includes an inlet port 235 coupled to an outlet 240 of a lubricant reservoir 245 by a first conduit 250. The illustrated outlet 240 is coupled to a bottom portion of the lubricant reservoir 245. The pump 225 also includes an outlet port 255 positioned opposite the inlet port 235. The outlet port 255 is coupled to a nozzle 260 by a second conduit 265. The illustrated nozzle 260 is coupled to a second side 270 of the housing 15 opposite the first side 110. Accordingly, the electric motor 40 drives the lubricant pump system 160 by the drive shaft 150 for the pump 225 to eject a lubricant (e.g., cutting chain oil) within the reservoir 245 from the nozzle 260. The nozzle 260 is positioned adjacent the guide bar 20 and the cutting chain 30 to dispense the lubricant on the cutting chain 30 during operation.

In the illustrated embodiment, the lubricant pump system 160 is non-adjustable. However, in other embodiments, the lubricant pump system 160 can be manually adjustable to regulate an amount/rate of lubricant being pumped to the cutting chain 30. For example, an adjustable lubricant pump system can include a pump shaft that rotates and reciprocates within a pump body and a cam shaft that engages the pump shaft to limit a stroke length of the pump shaft as the pump shaft reciprocates. The operator can then adjust the cam shaft causing an increase or a decrease in the stroke length of the pump shaft and a resultant change in the oil output of the adjustable lubricant pump system.

Figure 7:
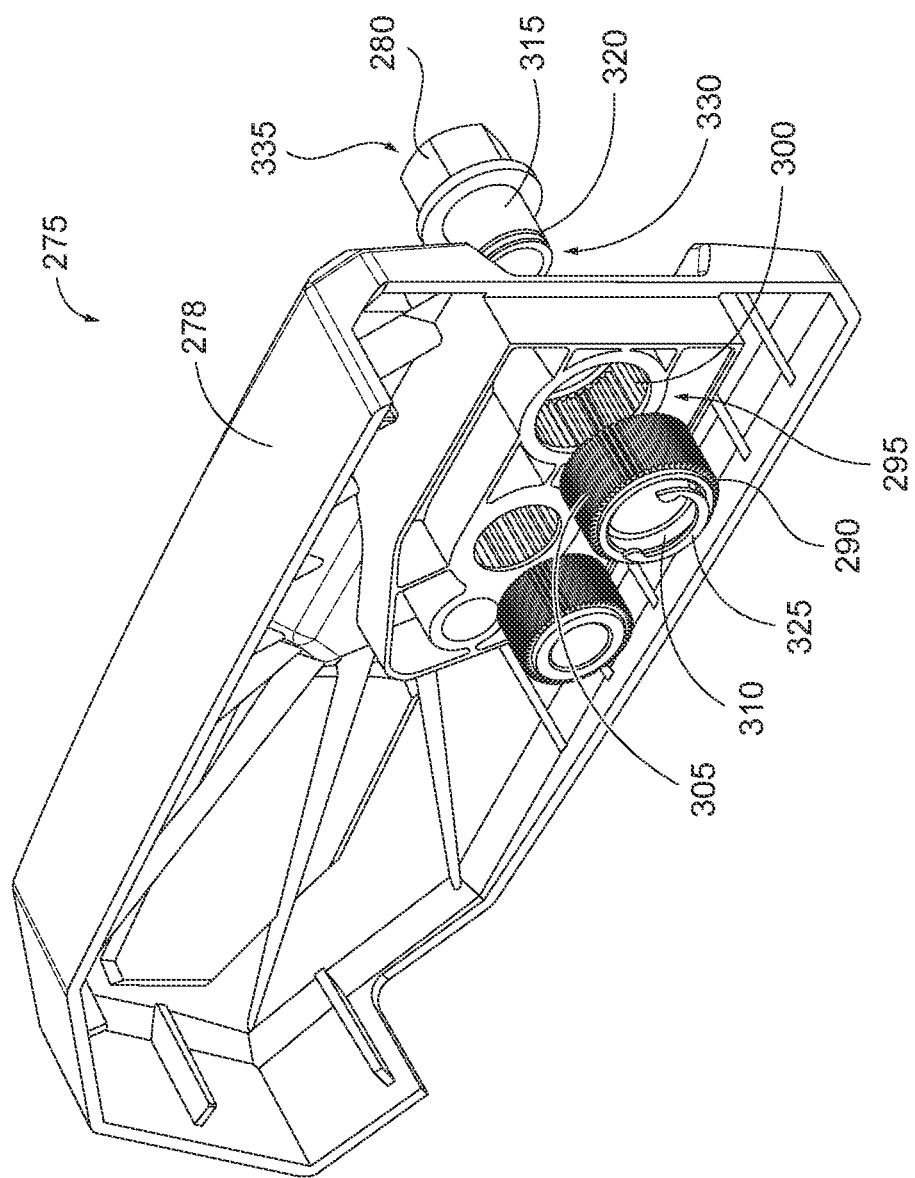
FIG. 7 is a perspective view of a cover assembly of the chainsaw of FIG. 1 that selectively covers a portion of a guide bar and a cutting chain of the chainsaw.
Figure 8:
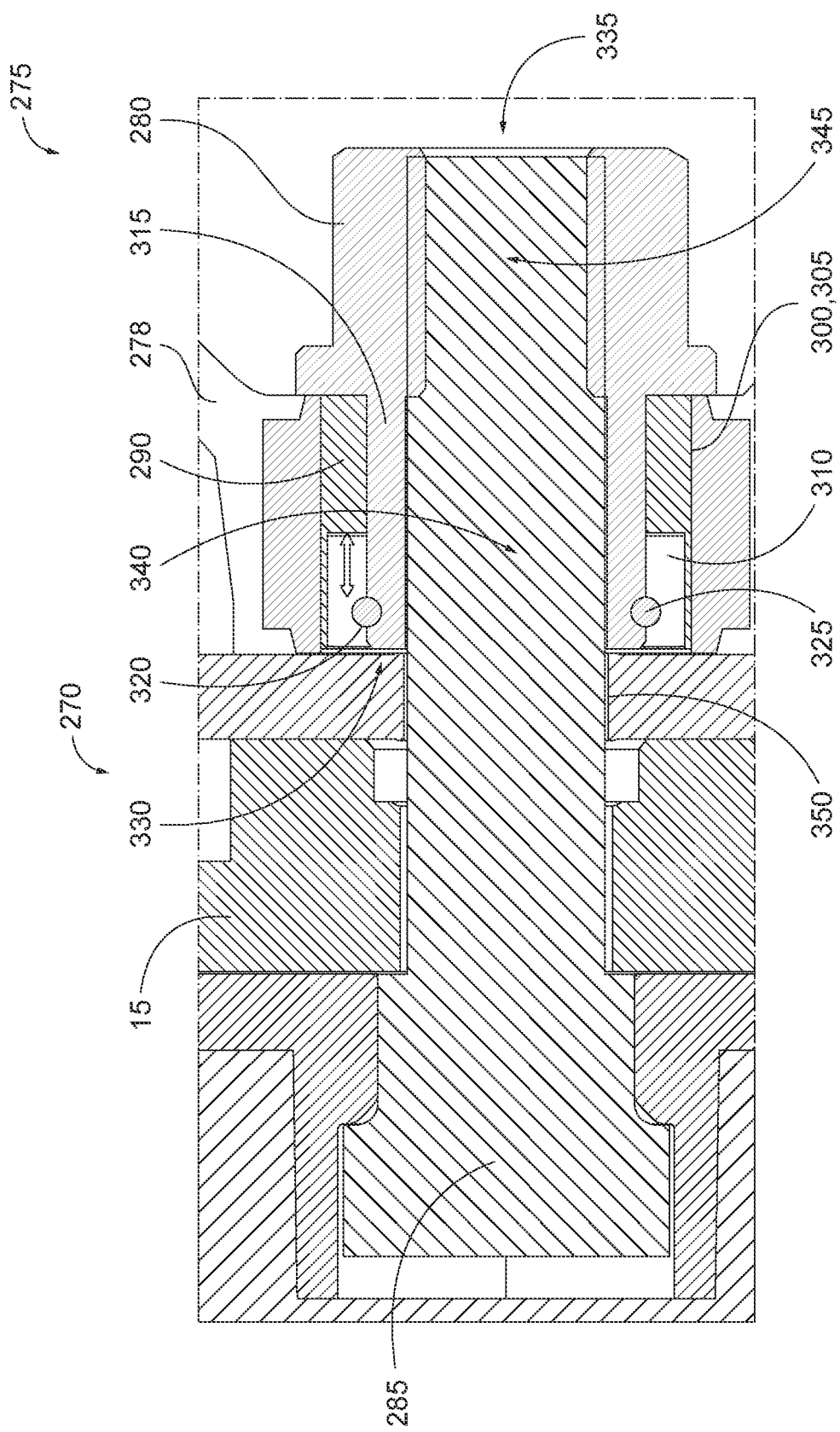
FIG. 8 is a cross sectional view of the cover assembly along line 8-8 of FIG. 1.

The guide bar 20 and the cutting chain 30 are selectively coupled to the second side 270 of the housing 15 by a cover assembly 275 (FIG. 1). With reference to FIGS. 7 and 8, the illustrated cover assembly 275 includes a cover 278 having a captured nut 280 that engages a stud 285 fixed to the second side 270 to secure the guide bar 20 and the cutting chain 30 to the second side 270. The captured nut 280 remains coupled (e.g., inseparable) to the cover 278 by an insert 290. As shown in FIG. 7, an aperture 295 of the cover 278 includes inwardly protruding ribs 300 that mesh with corresponding outwardly protruding ribs 305 of the insert 290 to prevent rotation of the insert 290 relative to the cover 278. In addition, the insert 290 is axially fixed within the aperture 295. The illustrated insert 290 includes an interior channel 310 defined in an inner surface thereof. FIG. 7 illustrates two inserts 290 each associated with a stud 285. In other embodiments, the cover assembly 275 can include one stud 285 and one insert 290.

As shown in FIGS. 7 and 8, the captured nut 280 includes a shank 315 having an exterior channel 320 defined therein. The captured nut 280 also includes a retainer 325 (e.g., a split ring) positioned within the exterior channel 320 of the shank 315. The retainer 325 is received within the interior channel 310 of the insert 290 such that the nut 280 can freely rotate relative to the insert 290 and the cover 278. The nut 280, however, is limited in axial travel relative to the insert 290. Specifically, the nut 280 is limited in outboard travel relative to the second side 270 by the retainer 325 engaging the interior channel 310, and the nut 280 is limited in inboard travel relative to the second side 270 by a head of the nut 280 engaging an outer surface of the cover 278. As such, the nut 280 can axially move relative to the cover 278 within a determined range. In other embodiments, the nut 280 can include different features to limit the nut 280 relative to the insert 290. For example, the channel 320 and the retainer 325 can be replaced with an integral flange extending from the shank 315. As shown in FIG. 8, the nut 280 includes an inner bore having a proximal portion 330 that is positioned closer to the second side 270 of the housing 15 than a distal portion 335 of the nut 280. In some embodiments, the proximal portion 330 can include threads, and the distal portion 335 can be a non-threaded portion. In other embodiments, the proximal portion 330 can be a non-threaded portion, and the distal portion 335 can include threads. In further embodiments, both the proximal and distal portions 330, 335 can include threads.

In the illustrated embodiment, the stud 285 includes a proximal portion 340 adjacent the second side 270 of the housing 15 and a distal portion 345 opposite the proximal portion 340. In some embodiments, both the proximal and distal portions 340, 345 of the stud 285 can include threads. In other embodiments, the proximal portion 340 can include threads, and the distal portion 345 can be a non-threaded portion. In further embodiments, the proximal portion 340 can be a non-threaded portion, and the distal portion 345 can include threads.

To secure the guide bar 20 to the second side 270 of the housing 15, the guide bar 20 is positioned relative to the stud 285 such that the stud 285 extends through a slot 350 of the guide bar 20. The cover 278 is then placed over the stud 285 and the guide bar 20 such that the stud 285 aligns with the aperture 295 of the cover 278. In some embodiments, the stud 285 extends completely through the aperture 295 and the insert 290, the stud 285 may partially extend within the aperture 295 and the insert 290, or the stud 285 may not extend within the aperture 295 and the insert 290 when the cover 278 is coupled to the lateral side 270). Placement of the cover 278 over the stud 285 automatically aligns the nut 280 with the stud 285. In particular, the distal portion 345 of the stud 285 is axially received within the proximal portion 330 of the nut 280 without threaded engagement therebetween. Accordingly, the nut 280 can axially slide onto the stud 285 to align the nut 280 with the stud 285, and then the nut 280 can be threadably rotated onto the stud 285 to secure the cover 278 and the bar 20 to the second side 270 of the housing 15.

In one embodiment the proximal portion 340 of the stud 285 can include threads, and at least the proximal portion 330 of the nut 280 can include threads. Accordingly, the threaded proximal portion 330 of the nut 280 can slide past the non-threaded distal portion 345 of the stud 285 to align the nut 280 with the stud 285, and then the threaded proximal portion 330 of the nut 280 engages the threaded proximal portion 340 of the stud 285 to secure the cover 278 to the second side 270. In another embodiment, the distal portion 345 of the stud 285 can include threads, and the distal portion 335 of the nut 280 can include threads. Accordingly, the non-threaded proximal portion 330 of the nut 280 can slide past the threaded distal portion 345 of the stud 285 to align the nut 280 with the stud 285, and then the threaded distal portion 335 of the nut 280 engages the threaded distal portion 345 of the stud 285 to secure the cover 278 to the second side 270).

Figure 9:
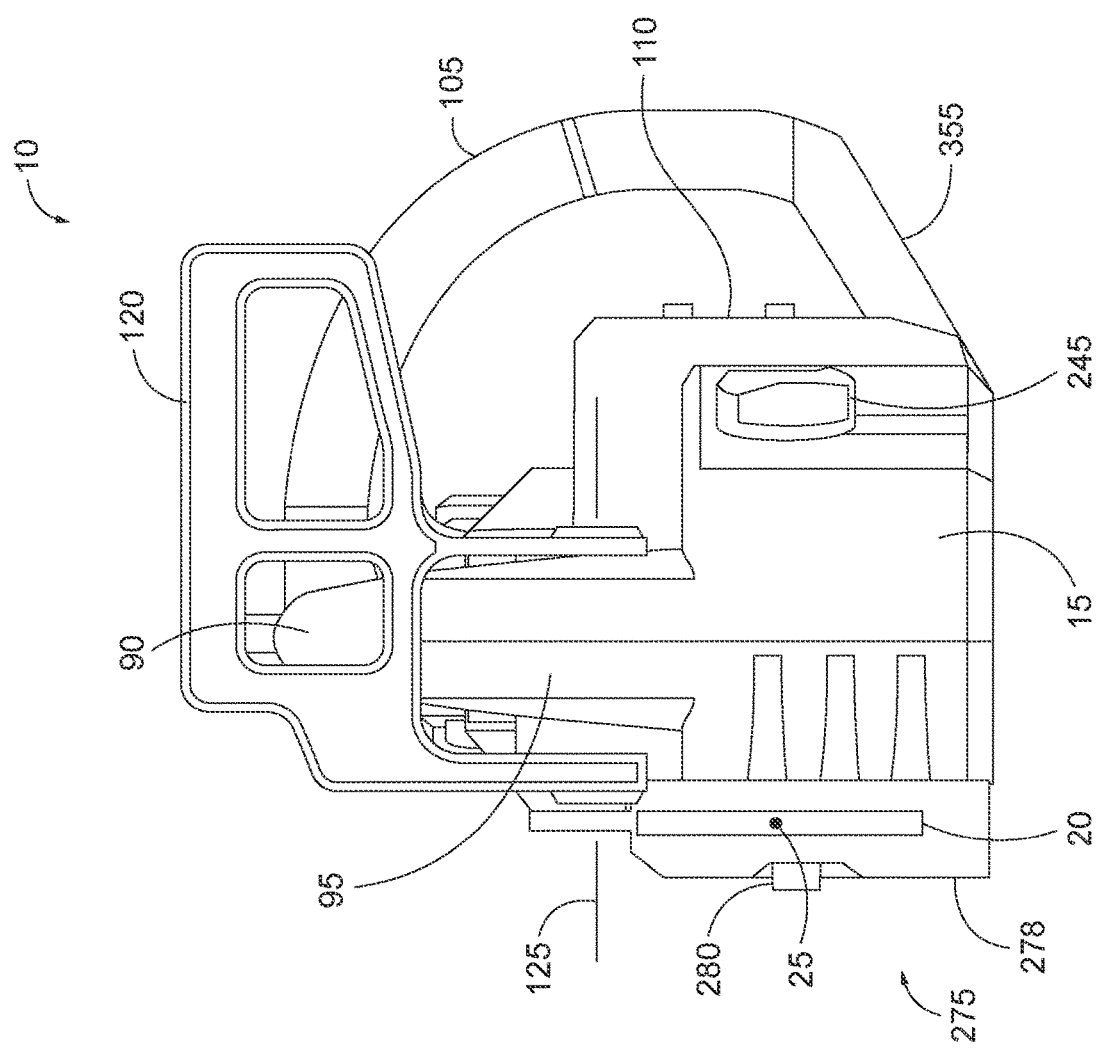
FIG. 9 is a front view of a chainsaw according to another embodiment illustrating a portion of a handle of the chainsaw operable to support the chainsaw on its side.

In one embodiment, as shown in FIG. 9, the second handle 105 can include a flat portion 355 formed adjacent the portion of the second handle 105 that is coupled to the battery pack receiving receptacle 55 (FIG. 3). When changing or adjusting the cutting chain 30 (e.g., removing or attaching the cover assembly 275 as discussed above), the chainsaw 10 can be tilted such that the flat portion 355 engages a support surface and the battery pack receiving receptacle 55 and/or the battery pack 50 also engage the support surface. In other words, the chainsaw 10 is supported at an angle relative to the support surface by engagement between the support surface and the flat portion 355 and the battery pack receiving receptacle 55/battery pack 50. As such, the operator can more easily hold the chainsaw: 10 in this orientation on the support surface without unwanted movement of the chainsaw 10 (e.g., inhibits the chainsaw 10 from rolling around on the support surface). The flat portion 355 provides additional stability to the chainsaw 10 to inhibit the chainsaw 10 from rocking about the second handle 105 (e.g., to enable easier and quicker changing or adjustment to the cutting chain 30). In other embodiments, the flat portion 355 can be positioned elsewhere on the second handle 105. In further embodiments, the flat portion 355 can be a straight surface, a flat edge, etc. of the second handle 105.

In addition, the tension of the cutting chain 30 on the guide bar 20 can be adjusted by a tension adjustment assembly 360. With reference to FIG. 4, the tension adjustment assembly 360 includes an adjustment gear 365 that drives a worm gear 370 that is threadably coupled to a pin 375. The adjustment gear 365 extends through the slot 350 of the guide bar 20 and the cover 278 when the cover assembly 275 is coupled to the second side 270 (FIG. 1) such that the tension of the cutting chain 30 can be adjusted when the cover assembly 275 is coupled to the housing 15. The pin 375 is received within an aperture of the guide bar 20 positioned below the slot 350 of the guide bar 20. As such, rotation of the adjustment gear 365 provides linear movement of the pin 375 relative to the housing 15 for the pin 375 to move the guide bar 20 relative to the housing 15 to tighten or loosen the cutting chain 30 on the guide bar 20.

Figure 10:
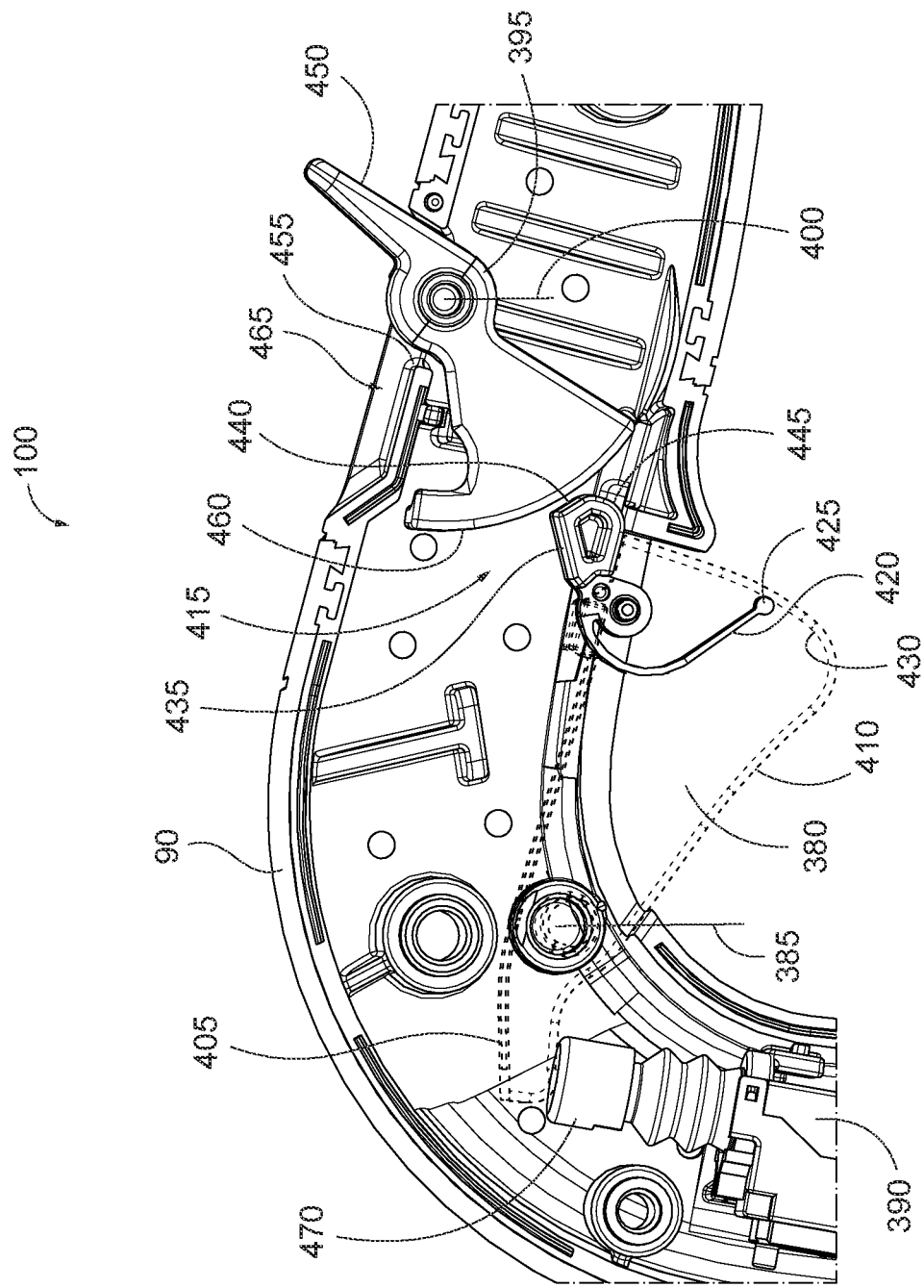
FIG. 10 is a perspective view of a trigger assembly of the chainsaw of FIG. 1 illustrating a trigger lock-off in a locked state and a trigger in an OFF position.

With reference to FIGS. 1 and 10, the illustrated trigger assembly 100 includes a trigger 380 pivotably coupled to the first handle 90 about a trigger pivot axis 385, a switch 390 (e.g., a plunger switch) engageable with the trigger 380, and a trigger lock-off 395 pivotably coupled to the first handle 90 about a lock-off pivot axis 400. Specifically, the trigger 380 includes an arm 405 extending forwardly from the trigger pivot axis 385 and an engagement surface 410 extending rearwardly from the trigger pivot axis 385. The illustrated trigger 380 also includes a protrusion 415 coupled to a distal end portion of the trigger 380 away from the trigger pivot axis 385. In particular, the protrusion 415 is pivotably coupled to the trigger 380 with a portion of the protrusion 415 positioned within the trigger 380 and a portion of the protrusion 415 extending beyond the trigger 380. The protrusion 415 includes a resilient arm 420 extending from one side of the pivot axis (e.g., a pivot point) of the protrusion 415 within the trigger 380 such that an end 425 of the resilient arm 420 engages an inner surface 430 of the trigger 380. A stop 435 of the protrusion 415 extends from another side of the pivot axis of the protrusion 415 to extend beyond a perimeter of the trigger 380. The illustrated stop 435 includes a flat surface 440 and a curved surface 445 adjacent the flat surface 440). The resilient arm 420 biases the stop 435 about the pivot axis of the protrusion 415 into engagement with an upper surface of the trigger 380.

Figure 12:
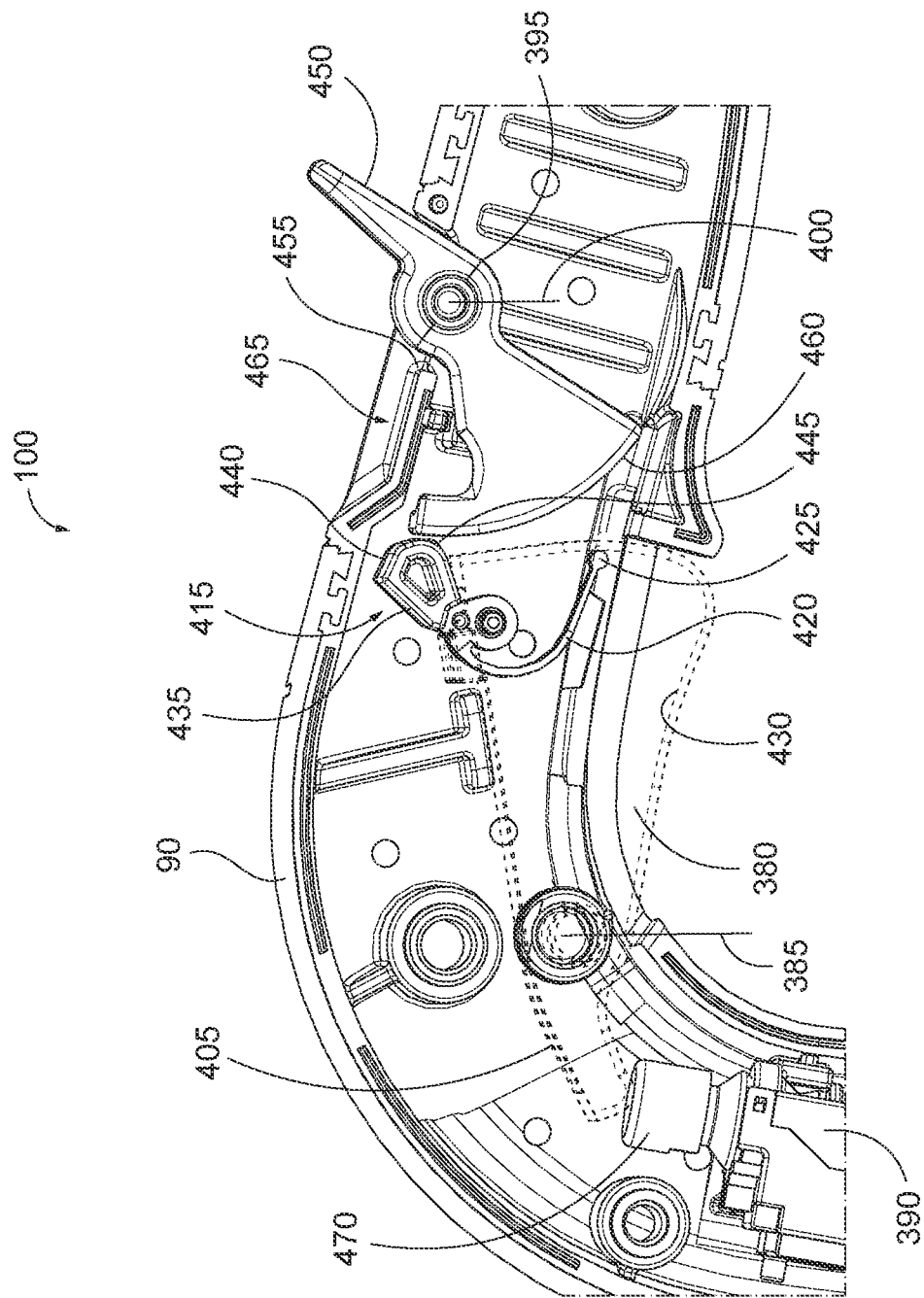
FIG. 12 is a perspective view of the trigger assembly of FIG. 10 illustrating the trigger lock-off in the locked state and the trigger in an ON position.

The illustrated stop 435 is engageable with the trigger lock-off 395 to prevent the trigger 380 from moving out of an OFF position (FIG. 10). The illustrated trigger lock-off 395 includes an actuation tab 450 extending through an opening 455 of the first handle 90 to extend beyond the first handle 90 when in a locked state (FIG. 10). The trigger lock-off 395 also includes a portion positioned within the first handle 90 having an arcuate surface 460) engageable with the stop 435 of the trigger 380 to prevent the trigger 380 from inadvertently moving out of the OFF position. The trigger lock-off 395 is biased in the locked state by a torsion spring coupled between the first handle 90 and the trigger lock-off 395. The trigger lock-off 395 is operable to prevent the trigger 380 from moving the switch 390 from a deactivated state (FIG. 10) to an activated state (FIG. 12). In particular, if the operator applies an upward force on the engagement surface 410 of the trigger 380 when the trigger lock-off 395 is in the locked state, the flat surface 440 of the stop 435 engages the arcuate surface 460 of the trigger lock-off 395 preventing the trigger 380 from moving the switch 390 into the activated state.

Figure 11:
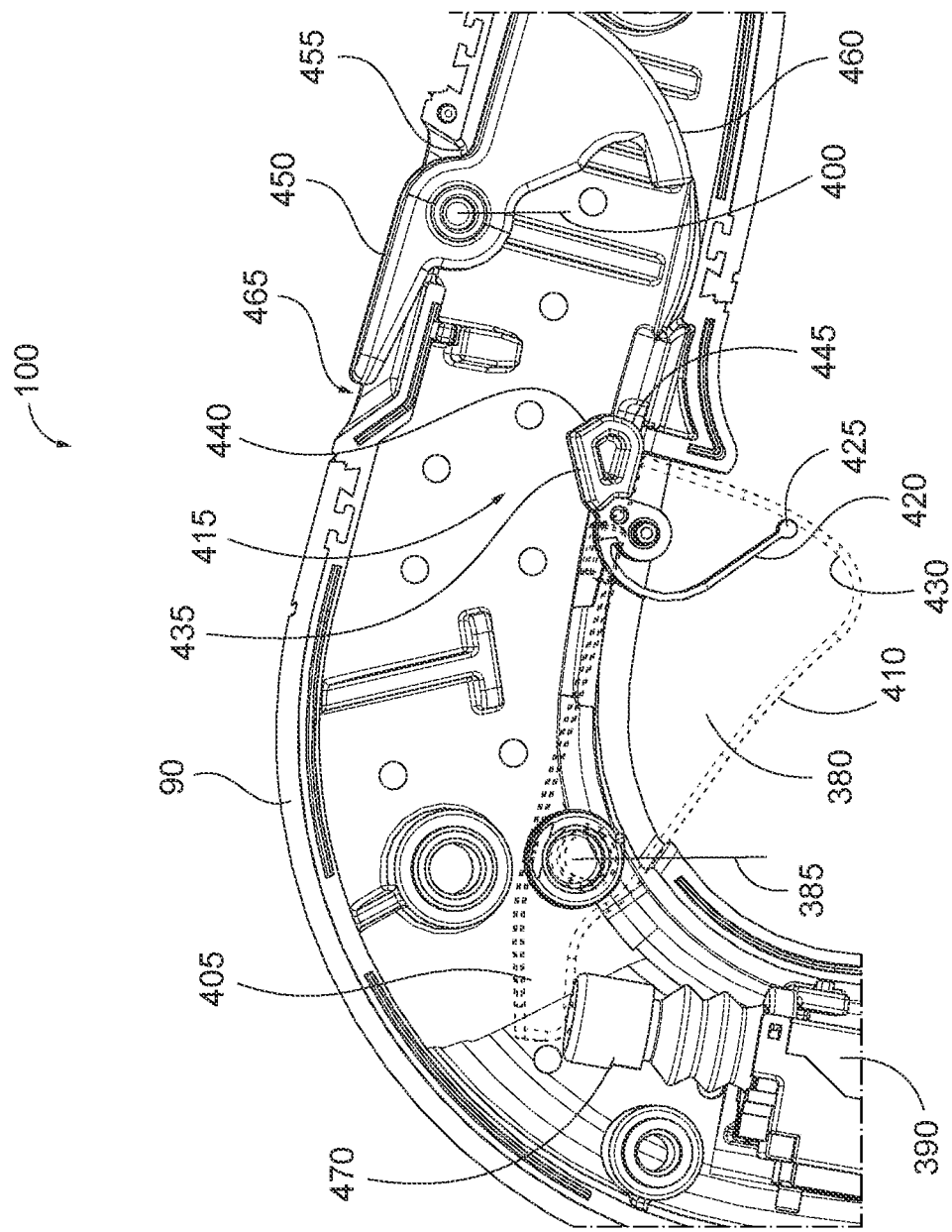
FIG. 11 is a perspective view of the trigger assembly of FIG. 10 illustrating the trigger lock-off in an unlocked state and the trigger in the OFF position.

As such, in order for the trigger 380 to move the switch 390 into the activated state (FIG. 12), the trigger lock-off 395 is first moved into an unlocked state (FIG. 11). In one embodiment, the operator's hand can slide along the first handle 90 to engage the actuation tab 450) and move the trigger lock-off 395 against the biasing force of the torsion spring. The trigger lock-off 395 can be moved relative to the first handle 90 such that the actuation tab 450) is substantially received within a recess 465 of the first handle 90. In other words, a longitudinal axis of the actuation tab 450 is substantially parallel to a longitudinal axis of the gripping portion of the first handle 90 when the actuation tab 450 is received within the recess 465. Accordingly, the operator can maintain the trigger lock-off 395 in the unlocked position by simply gripping the first handle 90. Once the trigger lock-off 395 is in the unlocked position, the trigger 380 can be moved about the trigger pivot axis 385 to an ON position (FIG. 12) for the arm 405 of the trigger 380 to move a biased plunger 470 of the switch 390 from the deactivated state (FIG. 11) into the activated state (FIG. 12). Moreover, the switch 390 activates operation of the electric motor 40 to ultimately drive the cutting chain 30 around the guide bar 20 when in the activated state. To stop operation of the electric motor 40, and ultimately movement of the cutting chain 30 around the guide bar 20, the trigger 380 is released allowing the biasing force of the plunger 470 to move the trigger 380) back into the OFF position (FIG. 10).

Figure 13:
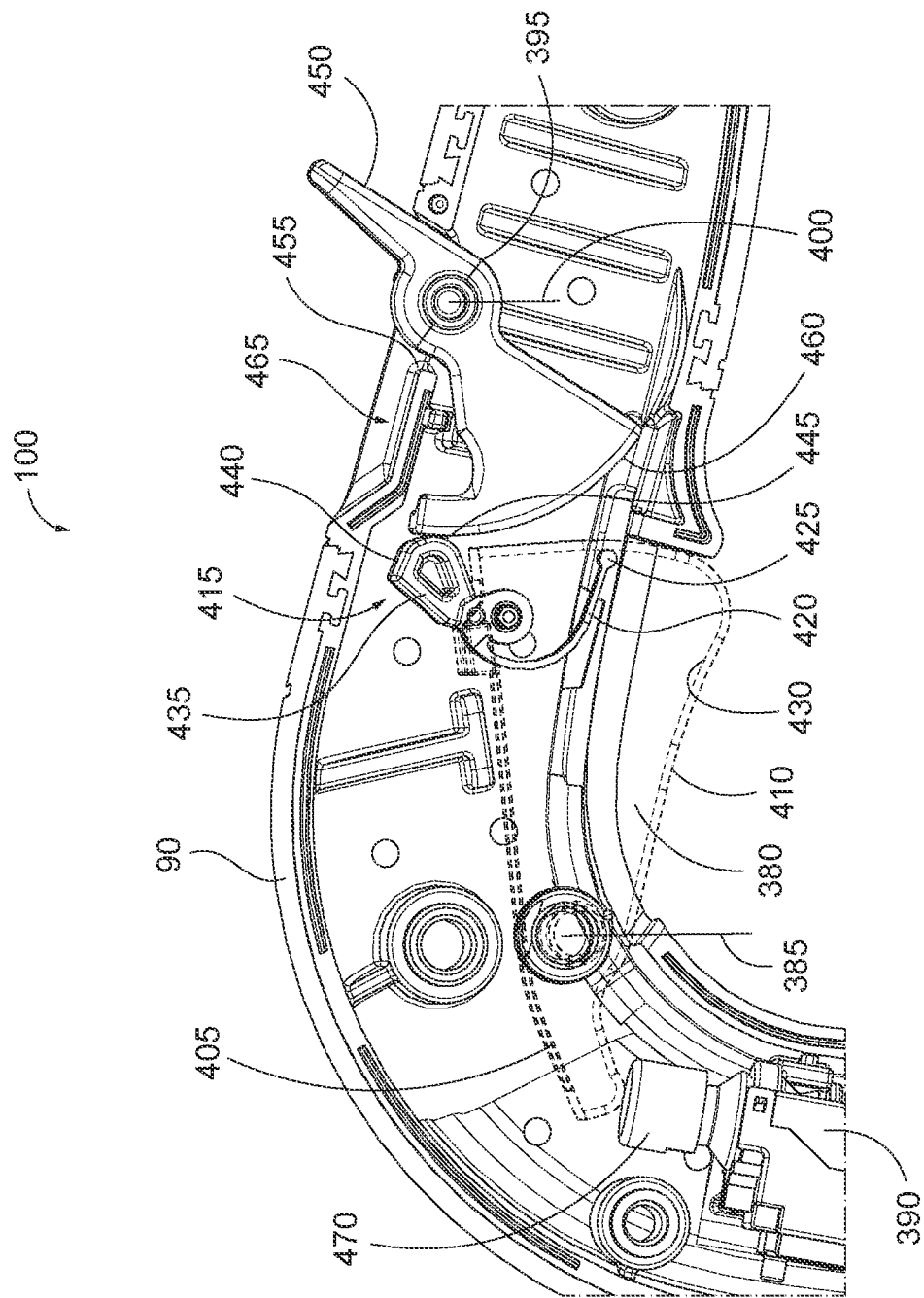
FIG. 13 is a perspective view of the trigger assembly of FIG. 10 illustrating the trigger lock-off in the locked state and the trigger in a first position relative to the trigger lock-off.
Figure 14:
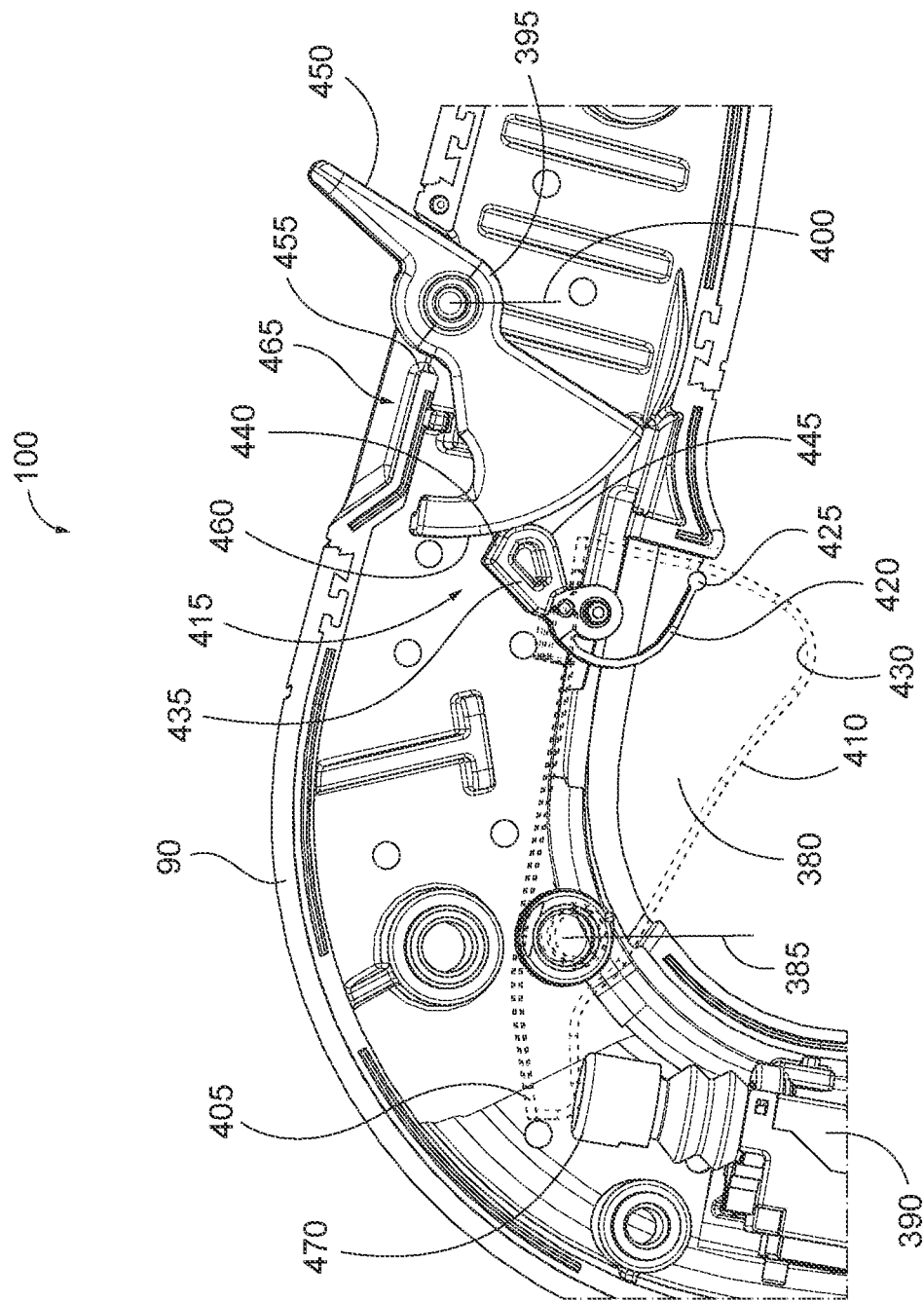
FIG. 14 is a perspective view of the trigger assembly of FIG. 10 illustrating the trigger lock-off in the locked state and the trigger in a second position relative to the trigger lock-off.

In the illustrated embodiment, the protrusion 215 assists the plunger 470) in moving the trigger 380) from the ON position (FIG. 12) to the OFF position (FIG. 10). FIGS. 12-14 illustrate different instances in time when the trigger 380 moves from the ON position to the OFF position as the trigger lock-off 395 is in the locked state. In particular, the operator can release the trigger lock-off 395 before releasing the trigger 380. As such, the trigger lock-off 395 moves back into the locked position by the biasing force of the torsional spring. When the trigger lock-off 395 is in the locked position and the trigger 380 is in the ON position, the curved surface 445 of the stop 435 aligns with the arcuate surface 460) of the trigger lock-off 395 (FIG. 12). Upon release of the trigger 380, the biasing force of the plunger 470 initiates movement of the trigger 380 toward the OFF position for the curved surface 445 to engage the arcuate surface 460 causing the stop 435 to pivot against the biasing force of the resilient arm 420 (FIG. 13). As a result, the biasing force of the resilient arm 420) forces engagement between the curved surface 445 and the arcuate surface 460) that causes the stop 435 to slide downwardly along the arcuate surface 460 as the trigger lock-off 395 remains in the locked position (FIG. 14). The biasing force of the resilient arm 420) ultimately provides a downward force on the trigger 380 to pivot the trigger 380 toward the OFF position. Accordingly, the biasing force of the resilient arm 420 assists the plunger 470) in moving the trigger 380 toward the OFF position when the trigger lock-off is in the locked position and the trigger 380 is released. In some embodiments, a space is provided between the stop 435 and the arcuate surface 460 when the trigger 380 is in the OFF position (FIG. 10) such that the resilient arm 420 is under little or no stress.

Figure 15:
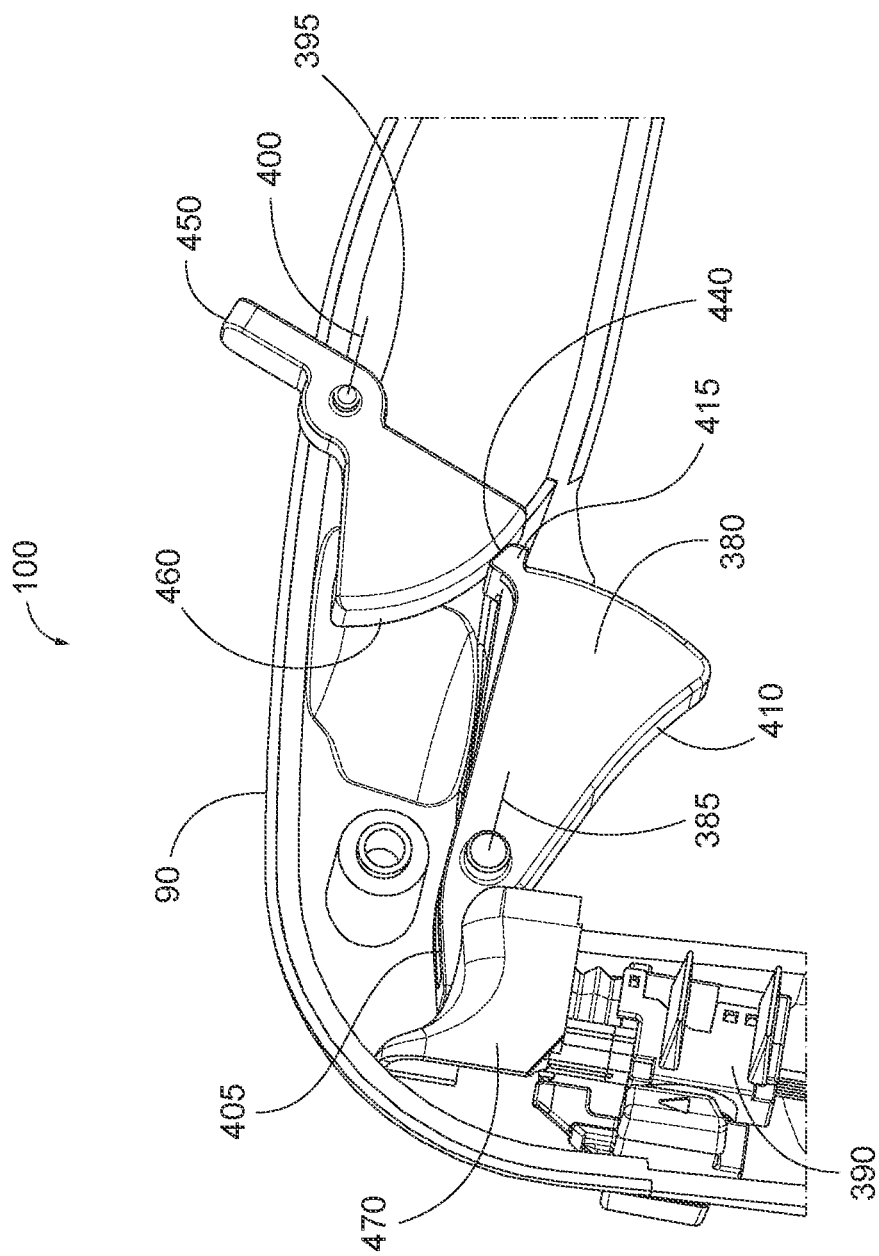
FIG. 15 is a perspective view of a trigger assembly according to another embodiment illustrating a trigger lock-off in a locked state and a trigger in an OFF position.
Figure 16:
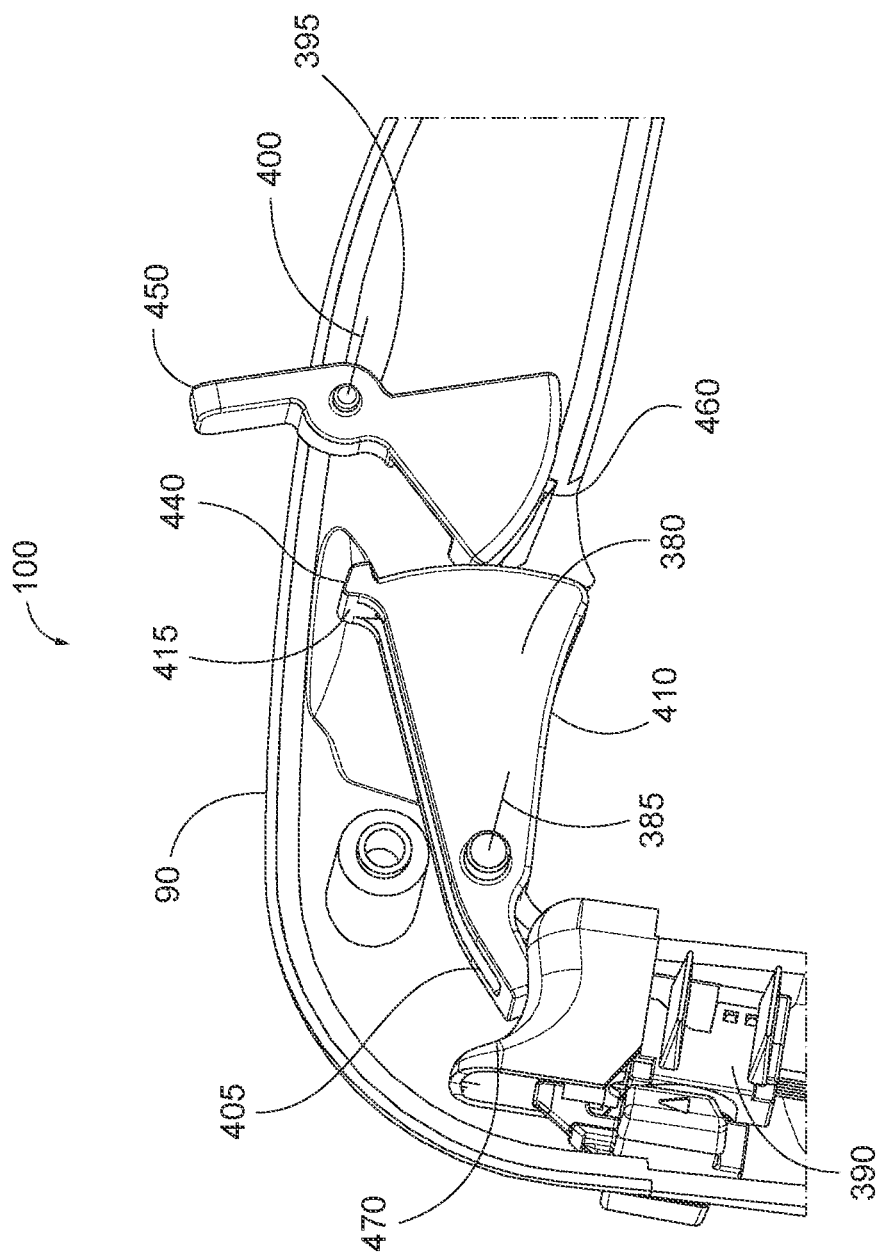
FIG. 16 is a perspective view of the trigger assembly of FIG. 15 illustrating the trigger lock-off in an unlocked state and the trigger in an ON position.

FIGS. 15 and 16 illustrate the trigger assembly 100 according to another embodiment of the disclosure. For example, the protrusion 215 is formed as one integral piece with the trigger 380. As such, the integrally formed protrusion 215 engages the trigger lock-off 395 when the trigger lock-off 395 is in the locked position to prevent the trigger 380 from moving the switch 390 from the deactivated state (FIG. 15) into the activated state (FIG. 16). In some embodiments, the trigger lock-off 395 can engage the integrally formed protrusion 215 when the trigger 380 is in the ON position such that the trigger lock-off 395 can maintain the trigger 380) in the ON position. For example, by the operator holding the trigger 380 in the ON position via the trigger lock-off 395 (e.g., by simply gripping the first handle 90 to rotate the trigger lock-off 395 in the clockwise direction in the reference frame of FIG. 15), the operator can experience less fatigue than directly holding the trigger 380 in the ON position. Once the trigger lock-off 395 is released by the operator, the plunger 470 biases the trigger 380 back into the OFF position.

With reference back to FIGS. 1 and 2, the illustrated chainsaw 10 also includes a protection sleeve 475 that is slidable along the longitudinal axis 25 of the guide bar 20 to protect the cutting chain 30 (e.g., during transportation of the chainsaw 10). In particular, the protection sleeve 475 includes an attachment portion 480 that extends over the cover assembly 275 for a detent 485 of the attachment portion 480) to engage the nut 280). Engagement between the nut 280) and the detent 485 maintains the protection sleeve 475 coupled to the guide bar 20. To remove the protection sleeve 475, the protection sleeve 475 is slid away from the housing 15 along the longitudinal axis 25 of the guide bar 20 such that the detent 485 slides over the nut 280. In addition, the protection sleeve 475 includes at least one attachment member 488 extending from a periphery of the protection sleeve 475. In one embodiment, the attachment members 488 are operable to hang the chainsaw 10 from a wall, a worksite, etc. For example, the protection sleeve 475 can be coupled to an operator basket of a lift by the attachment members 488 for the operator within the operator basket to selectively support the chainsaw 10 on the operator basket.

Also, the housing 15 of the chainsaw 10 includes a hanging attachment 490 (e.g., a hook, a loop, etc.) pivotably coupled a bottom surface 495 of the battery pack receptacle 55. The illustrated hanging attachment 490 is operable to support the chainsaw 10 when not in operation (e.g., a rope can be coupled to the hanging attachment 490, a hook can engage the hanging attachment 490, the chainsaw: 10 can be supported on the operator basket by the hanging attachment, etc.).

FIGS. 17-22 illustrate a chainsaw 10a according to another embodiment. The chainsaw 10a is similar to the chainsaw 10; therefore, similar components are designated with similar references numbers but including an "a." At least some differences and/or at least some similarities between the chainsaws 10, 10a will be discussed in detail below. In addition, components or features described with respect to the chainsaw 10a described herein are equally applicable to any other embodiments of the chainsaw described herein.

The chainsaw: 10a includes a battery pack receiving receptacle 55a coupled to a housing 15a for selectively receiving the battery pack 50. In the illustrated embodiment, the battery pack receiving receptacle 55a faces generally rearward, or away from a guide bar 20a, and away from the housing 15a. The battery pack receiving receptacle 55a defines an insertion axis 70a that is generally perpendicular to a longitudinal axis 25a of the guide bar 20a. The battery pack receiving receptacle 55a includes a first or upper receptacle housing 500a, and a second or lower receptacle housing 505a that are coupled to one another and to the housing 15a by first fasteners 510a, and the upper receptacle housing 500a is further coupled to the housing 15a by a second fastener 515a. The upper receptacle housing 500a defines first apertures 520a that receive the first fasteners 510a, and the lower receptacle housing 505a defines second apertures 525a corresponding to the first apertures 520a and that also receive the first fasteners 510a. In turn, the housing 15a includes threaded first bosses 530a corresponding to the second apertures 525a. The first fasteners 510a extend through first and second apertures 520a, 525a, and tighten into the threaded first bosses 530a to secure the upper receptacle housing 500a to the lower receptacle housing 505a, and also secure the battery pack receiving receptacle 55a to the housing 15a. In the illustrated embodiment, the chainsaw 10a includes three first fasteners 510a that secure the battery pack receiving receptacle 55a to the housing 15a at three locations. Moreover, the first and second apertures 520a, 525a, and the first bosses 530a, extend generally perpendicular to the insertion axis 70a, and generally perpendicular to the longitudinal axis 25a of the guide bar 20a.

Figure 19:
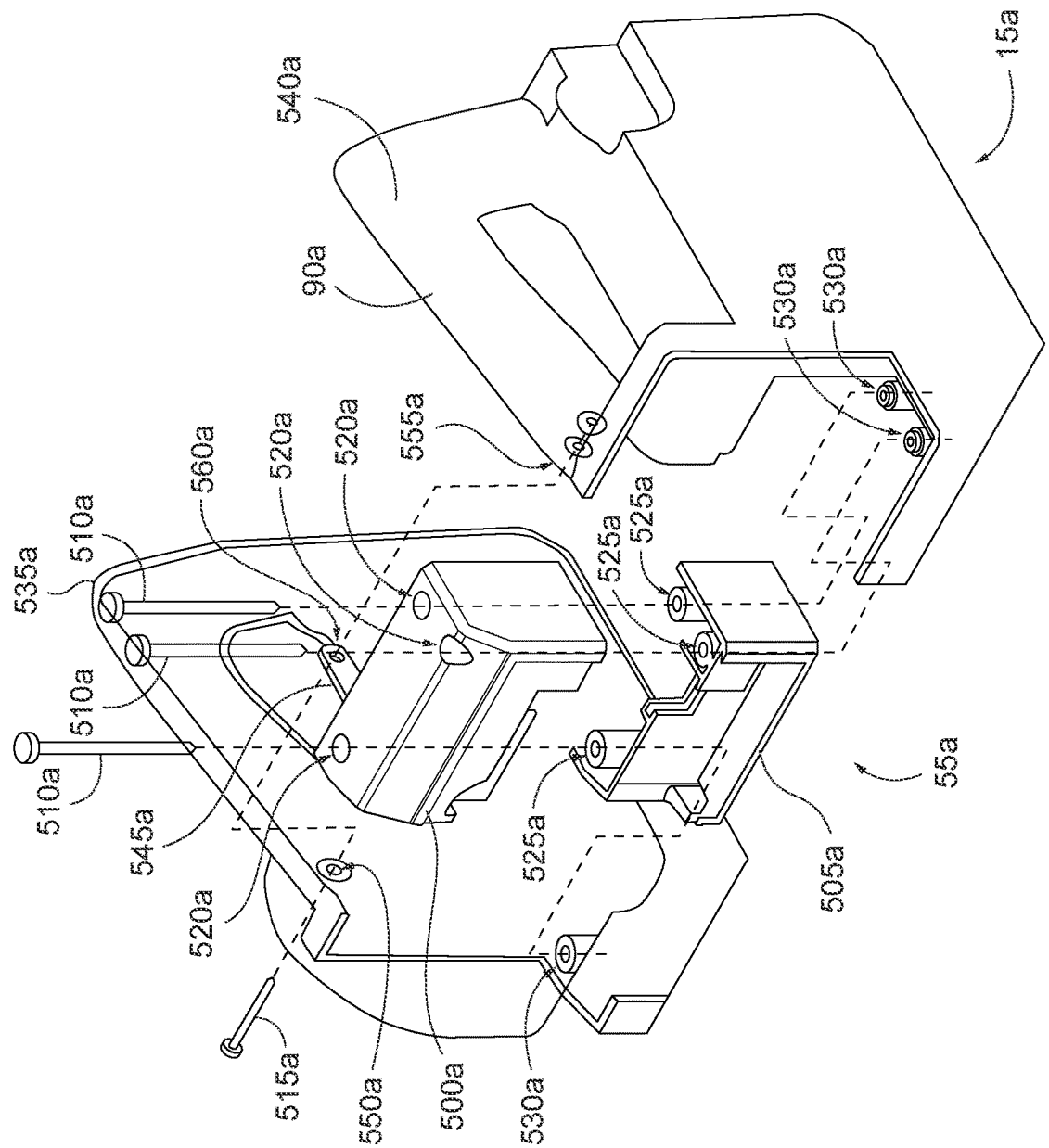
FIG. 19 is an exploded view of the portion of the chainsaw of FIG. 18.

The housing 15a includes corresponding first and second main housing halves 535a. 540a coupled to one another by fasteners. The upper receptacle housing 500a includes a retention member 545a, formed as a forwardly projecting rib as shown in FIG. 19, that is clamped between the main housing halves 535a, 540a proximate a first handle 90a to further secure the battery pack receiving receptacle 55a to the housing 15a. Specifically, the first main housing half 535a defines a third aperture 550a and the second main housing half 540a defines a corresponding threaded second boss 555a. The rib 545a of the upper receptacle housing 500a resides between the portions of the main housing halves 535a, 540a proximate the third aperture 550a and the second boss 555a, and includes a fourth aperture 560a (FIG. 19) corresponding to third aperture 550a and the second boss 555a. The second fastener 515a extends through the third aperture 550a and the fourth aperture 560a, and tightens into the second boss 555a to clamp the rib 545a. The second fastener 515a secures the battery pack receiving receptacle 55a to the housing 15a at a fourth location proximate the first handle 90a. Moreover, the third aperture 550a, the fourth aperture 560a, and the second boss 555a extend generally parallel to the insertion axis 70a.

Figure 23:
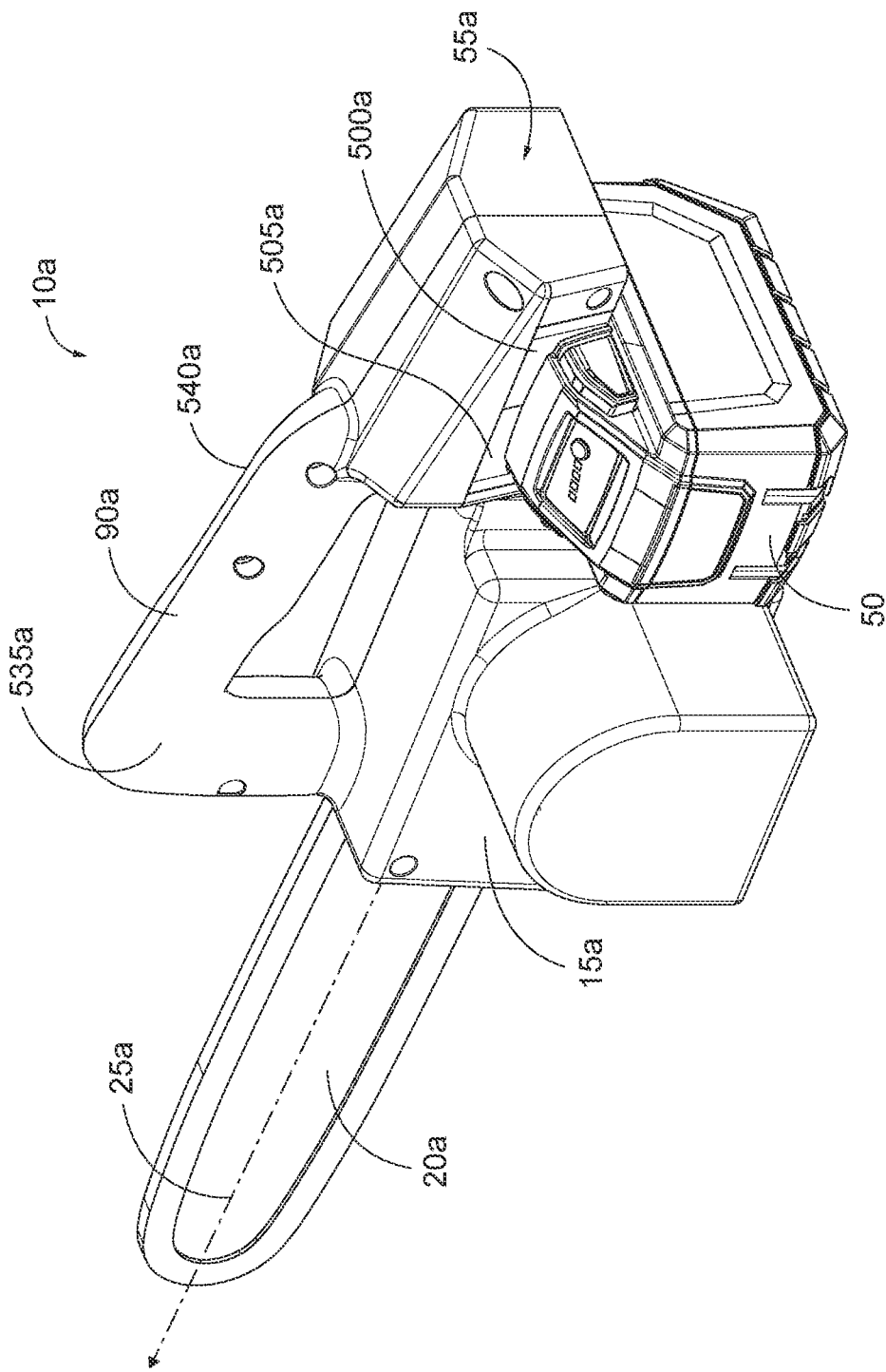
FIG. 23 is a perspective view of a chainsaw according to another embodiment illustrating a battery pack coupled to the battery pack receiving receptacle.

In other embodiments, the battery pack receiving receptacle 55a can be oriented differently relative to the housing 15a, for example, as shown in FIG. 23. For example, the battery pack receiving receptacle 55a can extend outwardly from the housing 15a for the battery pack receiving receptacle 55a to face in a direction toward a bottom surface 495a of the housing 15a.

Figure 24:
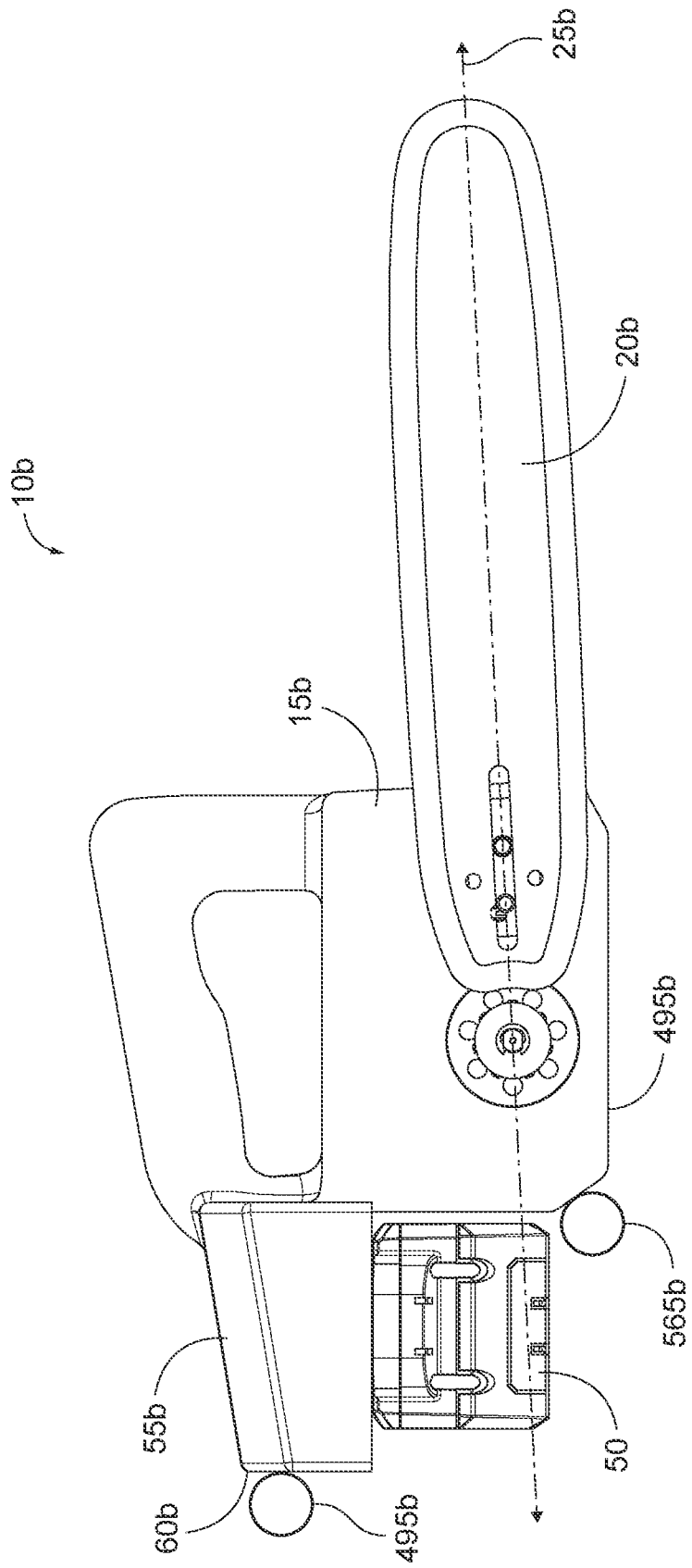
FIG. 24 is a side view of a chainsaw according to another embodiment illustrating hanging attachments coupled to a housing and a battery pack receiving receptacle of the chainsaw.

FIG. 24 illustrates a chainsaw 10b according to another embodiment. The chainsaw 10b is similar to the chainsaw 10; therefore, similar components are designated with similar references numbers but including an "b." At least some differences and/or at least some similarities between the chainsaws 10, 10b will be discussed in detail below. In addition, components or features described with respect to the chainsaw 10b described herein are equally applicable to any other embodiments of the chainsaw described herein.

The chainsaw 10b includes a first hanging attachment 490b (e.g., a support feature location) and a second hanging attachment 565b (e.g., a support feature location), for locating a support feature, such as a hanging hook (not shown), on the chainsaw 10b. The first hanging attachment 490b is at a rear portion 60b of a housing 15b, at furthest rearward extent of a battery pack receiving receptacle 55b. The first hanging attachment 490b is positioned above the battery pack 50 when the battery pack 50 is coupled to the battery pack receiving receptacle 55b. The second hanging attachment 565b is at a bottom surface 495b of the housing 15b, below the battery pack receiving receptacle 55b and below a longitudinal axis 25b of a guide bar 20b. In the illustrated embodiment, the second hanging attachment 565b is positioned between the first hanging attachment 490b and the guide bar 20b in a direction along the longitudinal axis 25b.

Although the application has been described in detail with reference to certain preferred embodiments, variations and modifications exist within the scope and spirit of one or more independent aspects of the application as described. Various features and advantages of the disclosure are set forth in the following claims.

The invention claimed is:

1. A power tool comprising:
   a housing;
   a battery pack selectively coupled to the housing;
   a motor supported within the housing, the motor electrically coupled to the battery pack when the battery pack is coupled to the housing;
   a switch supported within the housing, the switch moveable between a first position enabling activation of the motor by the battery pack and a second position disabling the motor;
   a trigger movably coupled to the housing between an OFF position and an ON position, the switch moves from the second position to the first position in response to the trigger moving from the OFF position to the ON position; and
   a trigger lock-off pivotably coupled to the housing between a lock position and an unlock position, the trigger lock-off engageable with the trigger to inhibit movement of the trigger from the OFF position to the ON position when the trigger lock-off is in the lock position, the trigger lock-off allowing movement of the trigger from the OFF position to the ON position when the trigger lock-off is in the unlock position;
   wherein the trigger includes a protrusion pivotably coupled to the trigger for movement with the trigger between the OFF position and the ON position, and
   wherein the protrusion engages the trigger lock-off to inhibit movement of the trigger from the OFF position to the ON position.

2. The power tool of claim 1, wherein the protrusion includes a resilient arm positioned within the trigger to engage an inner surface of the trigger and a stop extending from the trigger, and wherein the resilient arm biases the stop into engagement with an upper surface of the trigger.

3. The power tool of claim 2, wherein the stop includes a flat surface engageable with an arcuate surface of the trigger lock-off to inhibit movement of the trigger from the OFF position to the ON position.

4. The power tool of claim 3, wherein the stop includes a curved surface adjacent the flat surface, and wherein the resilient arm biases the curved surface in engagement with the arcuate surface of the trigger lock-off when the trigger lock-off is in the locked position and the trigger is moving from the ON position toward the OFF position.

5. The power tool of claim 4, wherein the switch includes a plunger engageable with a portion of the trigger, wherein the plunger biases the trigger from the ON position toward the OFF position, and wherein the engagement between the curved surface of the stop and the arcuate surface of the trigger lock-off assists the plunger in biasing the trigger from the ON position toward the OFF position.

6. The power tool of claim 1, wherein the trigger includes a protrusion formed integral with the trigger, and wherein the protrusion engages the trigger lock-off when in the locked position for the trigger lock-off to hold the trigger in the ON position.

7. The power tool of claim 1, further comprising a guide bar coupled to the housing and a cutting chain coupled to the guide bar, wherein the cutting chain is driven around the guide bar by the motor when the trigger is in the ON position.

8. A power tool comprising:
   a housing having a handle;
   a motor supported within a portion of the housing;
   a switch supported within the handle, the switch moveable between a first position enabling activation of the motor and a second position disabling the motor;
   a trigger movably coupled to the handle between an OFF position and an ON position, the switch moves from the second position to the first position in response to the trigger moving from the OFF position to the ON position, the trigger including a resilient protrusion that moves with the trigger between the OFF position and the ON position; and
   a trigger lock-off pivotably coupled to the handle between a lock position and an unlock position, the trigger lock-off engageable with the resilient protrusion to inhibit movement of the trigger from the OFF position to the ON position when the trigger lock-off is in the lock position, the trigger lock-off allowing movement of the trigger from the OFF position to the ON position when the trigger lock-off is in the unlock position;
   wherein the resilient protrusion is pivotably coupled to the trigger.

9. The power tool of claim 8, wherein the resilient protrusion includes an arm positioned within the trigger to engage an inner surface of the trigger and a stop extending from the trigger, and wherein the arm biases the stop into engagement with an upper surface of the trigger.

10. The power tool of claim 9, wherein the stop includes a flat surface engageable with an arcuate surface of the trigger lock-off to inhibit movement of the trigger from the OFF position to the ON position.

11. The power tool of claim 10, wherein the stop includes a curved surface adjacent the flat surface, and wherein the arm biases the curved surface in engagement with the arcuate surface of the trigger lock-off when the trigger lock-off is in the locked position and the trigger is moving from the ON position toward the OFF position.

12. The power tool of claim 11, wherein the switch includes a plunger engageable with a portion of the trigger, wherein the plunger biases the trigger from the ON position toward the OFF position, and wherein the engagement between the curved surface of the stop and the arcuate surface of the trigger lock-off assists the plunger in biasing the trigger from the ON position toward the OFF position.

13. The power tool of claim 8, further comprising a guide bar coupled to the housing and a cutting chain coupled to the guide bar, wherein the cutting chain is driven around the guide bar by the motor when the trigger is in the ON position.

14. A power tool comprising:
    a housing having a handle;
    a motor supported within a portion of the housing;
    a switch supported within the handle, the switch including a plunger moveable between a first position enabling activation of the motor and a second position disabling the motor;
    a trigger pivotably coupled to the handle about a pivot axis between an OFF position and an ON position, the trigger including an arm and an engagement surface, the pivot axis positioned between the arm and the engagement surface, the arm engageable with the plunger, the engagement surface configured to be engaged by an operator to move the trigger from the OFF position toward the ON position, the trigger including a resilient protrusion that moves with the trigger between the OFF position and the ON position; and
    a trigger lock-off pivotably coupled to the handle between a lock position and an unlock position, the trigger lock-off engageable with the resilient protrusion to inhibit movement of the trigger from the OFF position to the ON position when the trigger lock-off is in the lock position, the trigger lock-off allowing movement of the trigger from the OFF position to the ON position when the trigger lock-off is in the unlock position,
    wherein the plunger biases the trigger from the ON position toward the OFF position, and wherein a biasing force of the resilient protrusion against the trigger lock-off assists the plunger in biasing the trigger from the ON position toward the OFF position when the trigger lock-off is in the locked position.

15. The power tool of claim 14, wherein the resilient protrusion includes an arm positioned within the trigger to engage an inner surface of the trigger and a stop extending from the trigger, and wherein the arm biases the stop into engagement with an upper surface of the trigger.

16. The power tool of claim 15, wherein the stop includes a flat surface engageable with an arcuate surface of the trigger lock-off to inhibit movement of the trigger from the OFF position to the ON position.

17. The power tool of claim 16, wherein the stop includes a curved surface adjacent the flat surface, and wherein the arm biases the curved surface in engagement with the arcuate surface of the trigger lock-off when the trigger lock-off is in the locked position and the trigger is moving from the ON position toward the OFF position.

18. The power tool of claim 14, further comprising a guide bar coupled to the housing and a cutting chain coupled to the guide bar, wherein the cutting chain is driven around the guide bar by the motor when the trigger is in the ON position.

* * * * *